(12) United States Patent
Fujita et al.

(10) Patent No.: US 10,757,290 B2
(45) Date of Patent: Aug. 25, 2020

(54) IMAGE PROCESSING APPARATUS BEING ABLE TO SIMULTANEOUSLY READ AND EXTRACT IMAGE DATA

(71) Applicant: SHARP KABUSHIKI KAISHA, Sakai, Osaka (JP)

(72) Inventors: Takao Fujita, Sakai (JP); Kenji Itoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/178,591

(22) Filed: Nov. 2, 2018

(65) Prior Publication Data

US 2019/0132471 A1 May 2, 2019

(30) Foreign Application Priority Data

Nov. 2, 2017 (JP) ................................. 2017-212780

(51) Int. Cl.
  *H04N 1/00* (2006.01)
  *H04N 1/203* (2006.01)
  *H04N 1/387* (2006.01)

(52) U.S. Cl.
  CPC ....... *H04N 1/2034* (2013.01); *H04N 1/00331* (2013.01); *H04N 1/00702* (2013.01); *H04N 1/387* (2013.01); *H04N 1/3877* (2013.01)

(58) Field of Classification Search
  CPC ............. H04N 1/2034; H04N 1/00702; H04N 1/3877; H04N 1/00331
  See application file for complete search history.

(56) References Cited

U.S. PATENT DOCUMENTS

| | | | | |
|---|---|---|---|---|
| 9,240,088 | B1* | 1/2016 | Magnus | ........... G06K 19/06028 |
| 2009/0009825 | A1* | 1/2009 | Honda | ................. H04N 1/3878 |
| | | | | 358/488 |
| 2009/0080782 | A1* | 3/2009 | Konishi | ............ H04N 1/00846 |
| | | | | 382/218 |
| 2016/0360054 | A1* | 12/2016 | Hasegawa | .......... H04N 1/00729 |
| 2017/0230538 | A1* | 8/2017 | Ono | ................... H04N 1/00702 |
| 2018/0077309 | A1* | 3/2018 | Saitoh | ................. H04N 1/3878 |

FOREIGN PATENT DOCUMENTS

| | | |
|---|---|---|
| JP | 2008-092451 A | 4/2008 |
| JP | 2009-100211 A | 5/2009 |

\* cited by examiner

*Primary Examiner* — Juan M Guillermety
(74) *Attorney, Agent, or Firm* — ScienBiziP, P.C.

(57) ABSTRACT

An image processing apparatus including: a document table on which at least one document is arrangeable; an image input unit reading the document arranged on the document table; an individual image extractor extracting image data read by the image input unit on a document basis to obtain image data of an individual image; a storage storing association information between an arrangement status of the document with respect to the document table and a reading surface of the document to be read by the image input unit; an arrangement status determiner determining the arrangement status of the document with respect to the document table on the basis of the image data of the individual image; and a reading surface determiner determining the reading surface of the document read by the image input unit on the basis of the association information and the arrangement status determined by the arrangement status determiner.

5 Claims, 16 Drawing Sheets

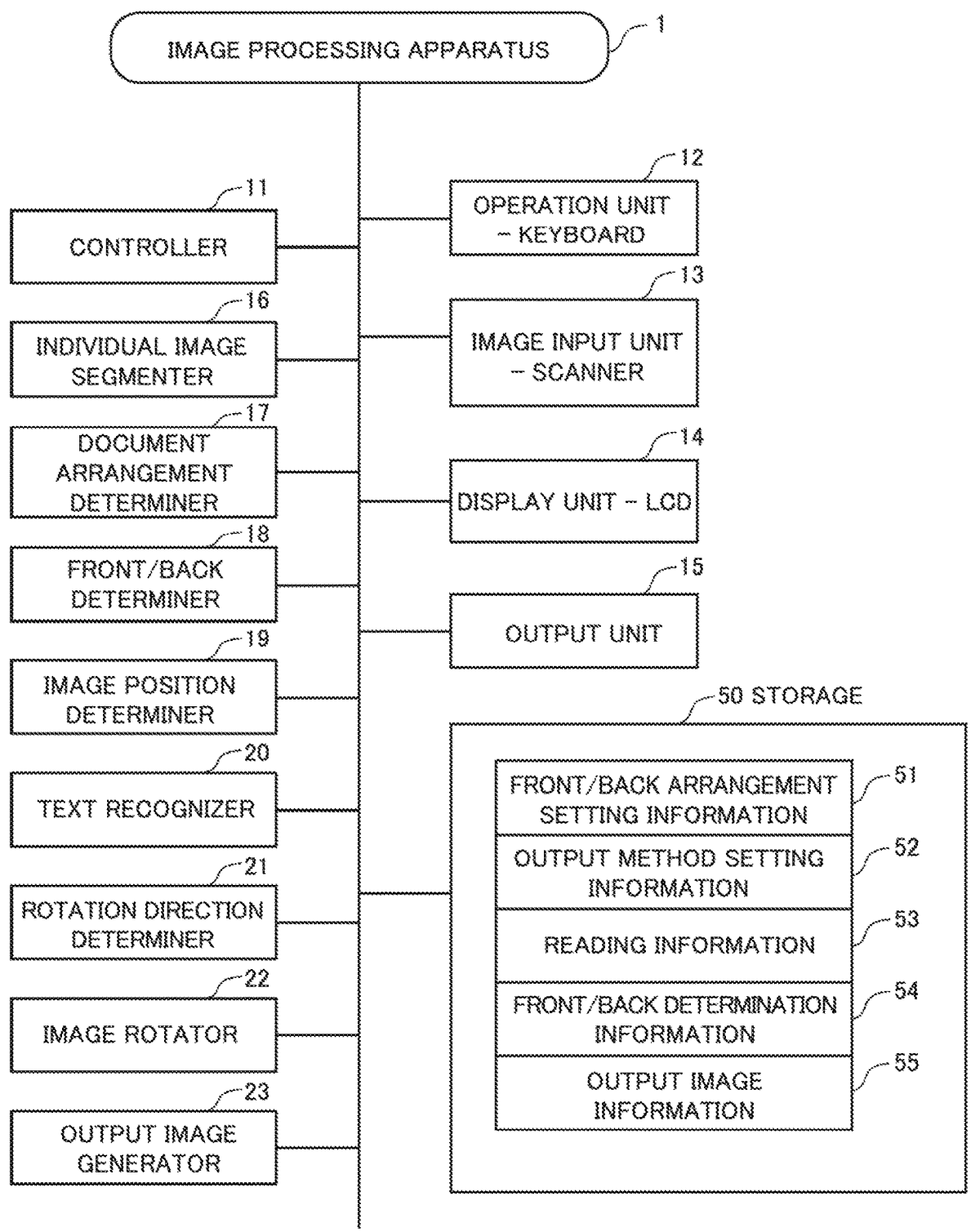

FIRST READING (DOCUMENT – FRONT SURFACE READING)

SECOND READING (DOCUMENT – BACK SURFACE READING)

FIRST READING (DOCUMENT – BACK SURFACE READING)

SECOND READING (DOCUMENT – FRONT SURFACE READING)

PRINT FRONT/BACK SURFACES ON ONE SHEET

FIRST READING (DOCUMENT – FRONT SURFACE READING)

SECOND READING (DOCUMENT – BACK SURFACE READING)

FIRST READING (DOCUMENT – BACK SURFACE READING)

SECOND READING (DOCUMENT – FRONT SURFACE READING)

FIRST READING (DOCUMENT – MIXED FRONT/BACK SURFACES READING)

SECOND READING (DOCUMENT – MIXED FRONT/BACK SURFACES READING)

FRONT/BACK COMPOSITE PRINTING OF SAME DOCUMENT

FRONT/BACK SEPARATE PRINTING OF MULTIPLE DOCUMENTS

FRONT/BACK COMPOSITE PRINTING OF ALL DOCUMENTS
(ON ONE PRINT SHEET)

FIG.5A
FRONT/BACK ARRANGEMENT SETTING INFORMATION

| READING SURFACE | DOCUMENT ARRANGEMENT |
|---|---|
| FRONT SURFACE | HORIZONTAL ARRANGEMENT |
| BACK SURFACE | VERTICAL ARRANGEMENT |

FIG.5B
OUTPUT METHOD SETTING INFORMATION

| NO. | OUTPUT METHOD |
|---|---|
| 1 | FRONT/BACK IMAGES IN COMPOSITION |
| 2 | FRONT/BACK IMAGES SEPARATELY |
| 3 | ALL IMAGES IN COMPOSITION ON SAME PRINT SHEET |
| 4 | INPUT IMAGE SEPARATELY |

FIG.5C
READ INFORMATION

| READING NO. | INPUT IMAGE NO | DOCUMENT APEX POSITION COORDINATES | HORIZONTAL LENGTH | VERTICAL LENGTH | MIDPOINT POSITION | IMAGE DATA |
|---|---|---|---|---|---|---|
| SC01 | NO1 | P1 P2 P3 P4 (x1,y1) (x2,y2) (x3,y3) (x4,y4) | L1 | L2 | P5 | IMG001 |
| SC02 | NO2 | P6 P7 P8 P9 (x6,y6) (x7,y7) (x8,y8) (x9,y9) | L6 | L7 | P10 | IMG002 |

FIG.5D
FRONT/BACK DETERMINATION INFORMATION

| INPUT IMAGE NO. | COMPARED LENGTH | DETERMINED ARRANGEMENT | DETERMINATION OF FRONT/BACK OF READING SURFACE | TEXT DIRECTION | ROTATION DIRECTION | DOCUMENT IDENTIFICATION NO. |
|---|---|---|---|---|---|---|
| NO1 | L1>L2 | HORIZONTAL | FRONT SURFACE | — | — | G01 |
| NO2 | L6<L7 | VERTICAL | BACK SURFACE | RIGHT | LEFT 90 deg. | G01 |

FIG.5E
OUTPUT IMAGE INFORMATION

| INPUT IMAGE NO | DOCUMENT IDENTIFICATION NO. | DETERMINATION OF FRONT/BACK OF READING SURFACE | IMAGE DATA |
|---|---|---|---|
| NO1 | G01 | FRONT SURFACE | IMG001 |
| NO2 | G01 | BACK SURFACE | IMG002 |

FIG.5F
EXAMPLE OF OUTPUT ON PAPER SHEETS

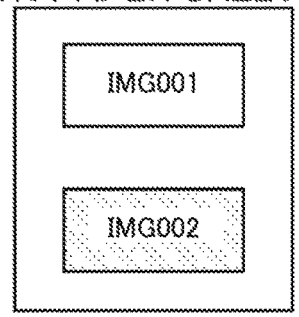

FIG.6A
DOCUMENT-FRONT SURFACE READING

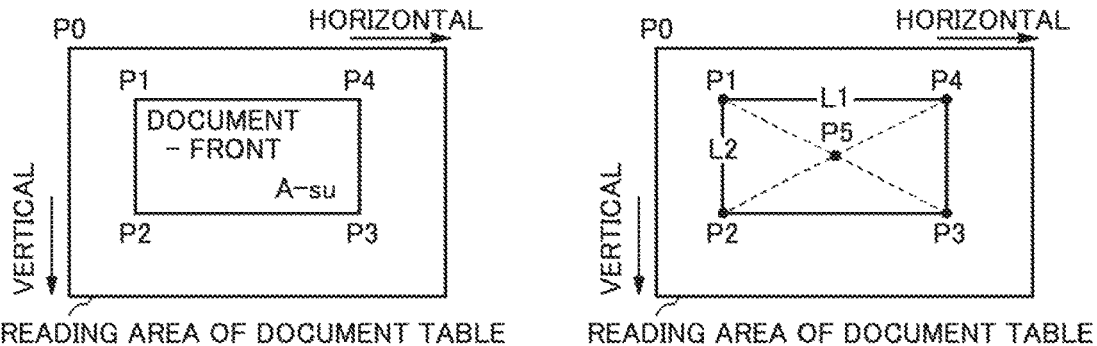

| INPUT IMAGE NO. | DOCUMENT APEX POSITION COORDINATES | | | | HORIZONTAL LENGTH | VERTICAL LENGTH | MIDPOINT POSITION | IMAGE DATA |
|---|---|---|---|---|---|---|---|---|
| N01 | P1 (x1,y1) | P2 (x2,y2) | P3 (x3,y3) | P4 (x4,y4) | L1 | L2 | P5 | IMG001 |

| INPUT IMAGE NO. | COMPARED LENGTH | DETERMINED ARRANGEMENT | DETERMINATION OF FRONT/BACK OF READING SURFACE | DOCUMENT IDENTIFICATION NO. |
|---|---|---|---|---|
| N01 | L1>L2 | HORIZONTAL | FRONT SURFACE | G01 |

FIG.6B
DOCUMENT-BACK SURFACE READING

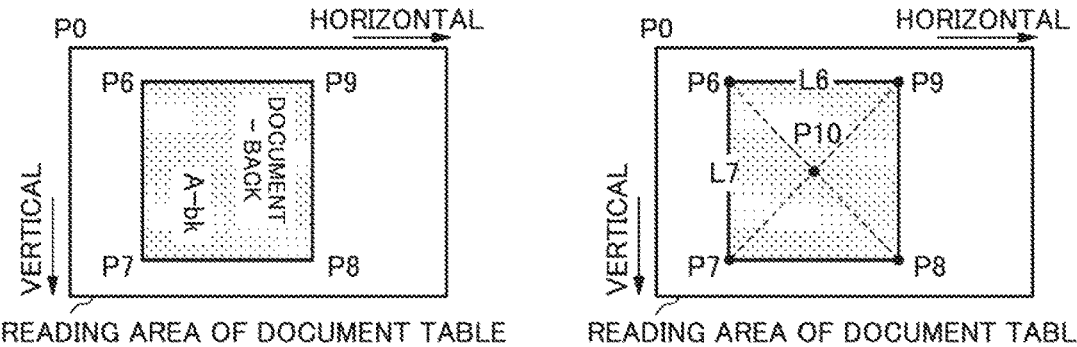

| INPUT IMAGE NO. | DOCUMENT APEX POSITION COORDINATES | | | | HORIZONTAL LENGTH | VERTICAL LENGTH | MIDPOINT POSITION | IMAGE DATA |
|---|---|---|---|---|---|---|---|---|
| N02 | P6 (x6,y6) | P7 (x7,y7) | P8 (x8,y8) | P9 (x9,y9) | L6 | L7 | P10 | IMG002 |

| INPUT IMAGE NO. | COMPARED LENGTH | DETERMINED ARRANGEMENT | DETERMINATION OF FRONT/BACK OF READING SURFACE | TEXT DIRECTION | ROTATION DIRECTION | DOCUMENT IDENTIFICATION NO. |
|---|---|---|---|---|---|---|
| N02 | L6<L7 | VERTICAL | BACK SURFACE | RIGHT | LEFT 90 deg. | G01 |

FIG.7A
1ST READING
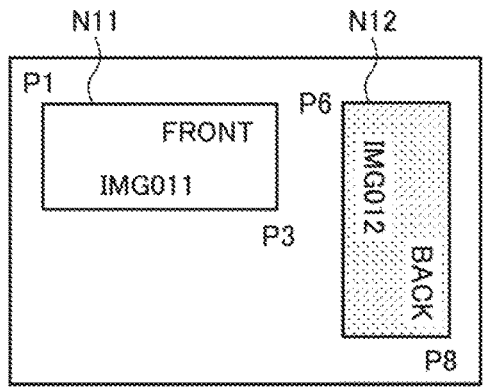
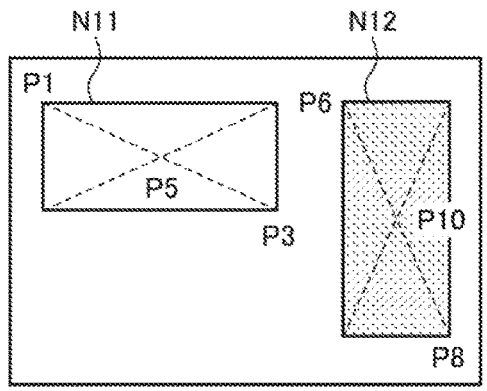
FIG.7B
2ND READING
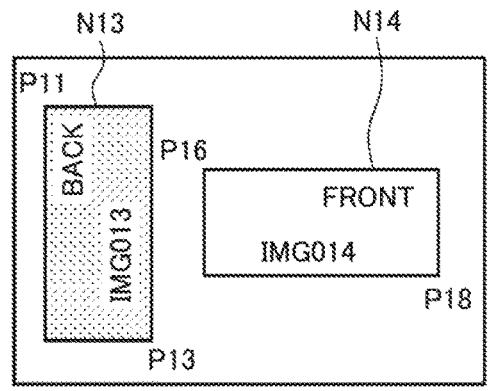
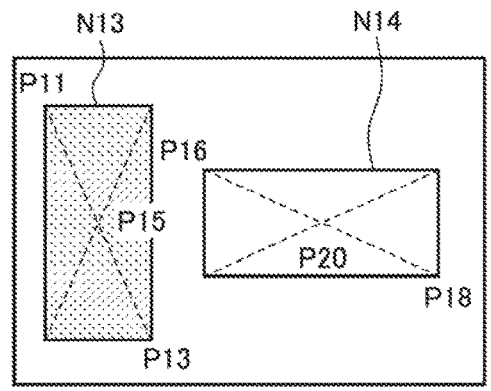
FIG.7C
READ INFORMATION
| READING NO. | INPUT IMAGE NO. | DOCUMENT APEX POSITION COORDINATES | | | | HORIZONTAL LENGTH | VERTICAL LENGTH | MIDPOINT POSITION | IMAGE DATA |
|---|---|---|---|---|---|---|---|---|---|
| SCO1 | N11 | P1 (x1,y1) | P2 (x2,y2) | P3 (x3,y3) | P4 (x4,y4) | L1 | L2 | P5 | IMG011 |
| SCO1 | N12 | P6 (x6,y6) | P7 (x7,y7) | P8 (x8,y8) | P9 (x9,y9) | L3 | L4 | P10 | IMG012 |
| SCO2 | N13 | P11 (x11,y11) | P12 (12,y12) | P13 (x13,y13) | P14 (x14,y14) | L5 | L6 | P15 | IMG013 |
| SCO2 | N14 | P16 (x16,y16) | P17 (x17,y17) | P18 (x18,y18) | P19 (x19,y19) | L7 | L8 | P20 | IMG014 |

FIG.7D
FRONT/BACK DETERMINATION INFORMATION

| INPUT IMAGE NO. | COMPARED LENGTH | DETERMINED ARRANGEMENT | DETERMINATION OF FRONT/BACK OF READING SURFACE | TEXT DIRECTION | ROTATION DIRECTION | DOCUMENT IDENTIFICATION NO. | MIDPOINT COMPARISON |
|---|---|---|---|---|---|---|---|
| N11 | L1>L2 | HORIZONTAL | FRONT SURFACE | — | — | G01 | — |
| N12 | L3<L4 | VERTICAL | BACK SURFACE | RIGHT | LEFT 90 deg. | G02 | — |
| N13 | L5<L6 | VERTICAL | BACK SURFACE | LEFT | RIGHT 90 deg. | G01 | (P5≒P15) |
| N14 | L7>L8 | HORIZONTAL | FRONT SURFACE | — | — | G02 | (P10≒P20) |

FIG.7E
OUTPUT IMAGE INFORMATION

| INPUT IMAGE NO. | DOCUMENT IDENTIFICATION NO. | DETERMINATION OF FRONT/BACK OF READING SURFACE | IMAGE DATA |
|---|---|---|---|
| N11 | G01 | FRONT SURFACE | IMG011 |
| N13 | G01 | BACK SURFACE | IMG013 |
| N12 | G02 | BACK SURFACE | IMG012 |
| N14 | G02 | FRONT SURFACE | IMG014 |

FIG.7F
EXAMPLE OF OUTPUT ON PAPER SHEETS

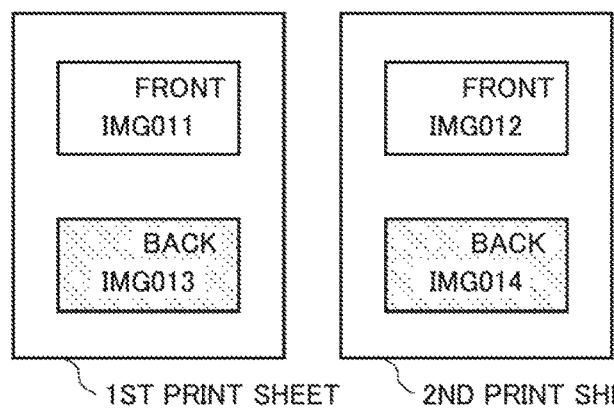

FIG.8 1ST SHEET READING (DOCUMENT-FRONT SURFACE READING)

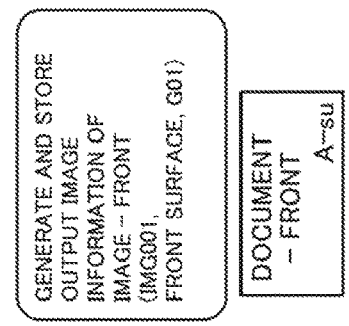

FIG.8D

GENERATE AND STORE OUTPUT IMAGE INFORMATION OF IMAGE – FRONT (IMG001, FRONT SURFACE, G01)

DOCUMENT – FRONT A-su

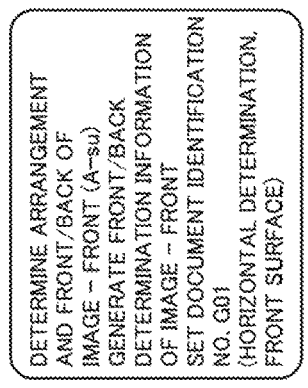

FIG.8C

DETERMINE ARRANGEMENT AND FRONT/BACK OF IMAGE – FRONT (A-su) GENERATE FRONT/BACK DETERMINATION INFORMATION OF IMAGE – FRONT SET DOCUMENT IDENTIFICATION NO. G01 (HORIZONTAL DETERMINATION, FRONT SURFACE)

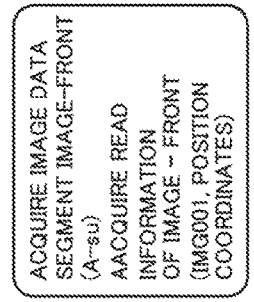

FIG.8B

ACQUIRE IMAGE DATA SEGMENT IMAGE-FRONT (A-su) AACQUIRE READ INFORMATION OF IMAGE – FRONT (IMG001, POSITION COORDINATES)

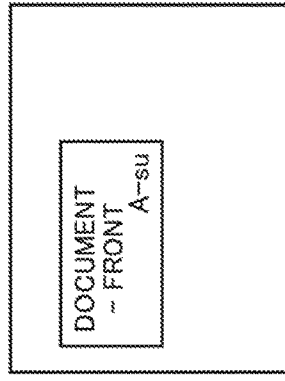

FIG.8A

DOCUMENT – FRONT A-su

READING AREA OF DOCUMENT TABLE

FIG. 9  2ND READING (DOCUMENT-BACK SURFACE READING)

FIG. 9A

READING AREA OF DOCUMENT TABLE

FIG. 9B

ACQUIRE IMAGE DATA
SEGMENT IMAGE-BACK
(A-bk)
ACQUIRE READING
INFORMATION OF
IMAGE-BACK
(IMG002, POSITION
COORDINATES)

FIG. 9C

DETERMINE ARRANGEMENT OF AND
FRONT/BACK OF IMAGE-BACK (A-bk)
GENERATE FRONT/BACK
DETERMINATION INFORMATION
OF IMAGE-BACK
SET DOCUMENT IDENTIFICATION
NO. G01
(VERTICAL ARRANGEMENT,
BACK SURFACE)

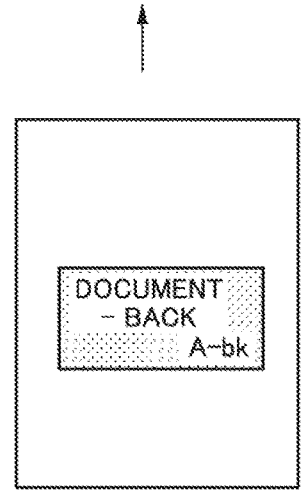

FIG. 9D

TEXT RECOGNITION OF IMAGE
DATA IMG002 OF IMAGE-BACK
DETERMINE RECOGNIZED
TEXT DIRECTION (RIGHT)
DETERMINE ROTATION DIRECTION
ROTATE IMAGE DATA
(90 deg. LEFT)

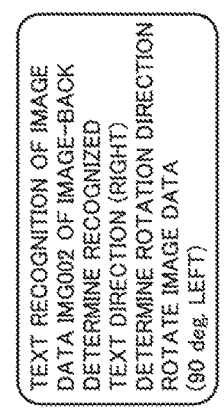

FIG. 9E

GENERATE AND STORE OUTPUT
IMAGE INFORMATION OF
ROTATED IMAGE-BACK (IMG002, BACK SURFACE, G01)

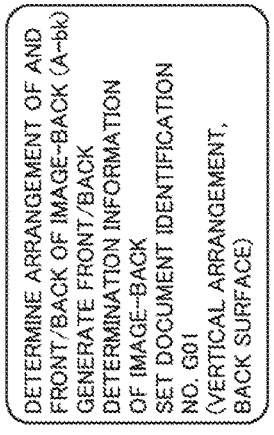

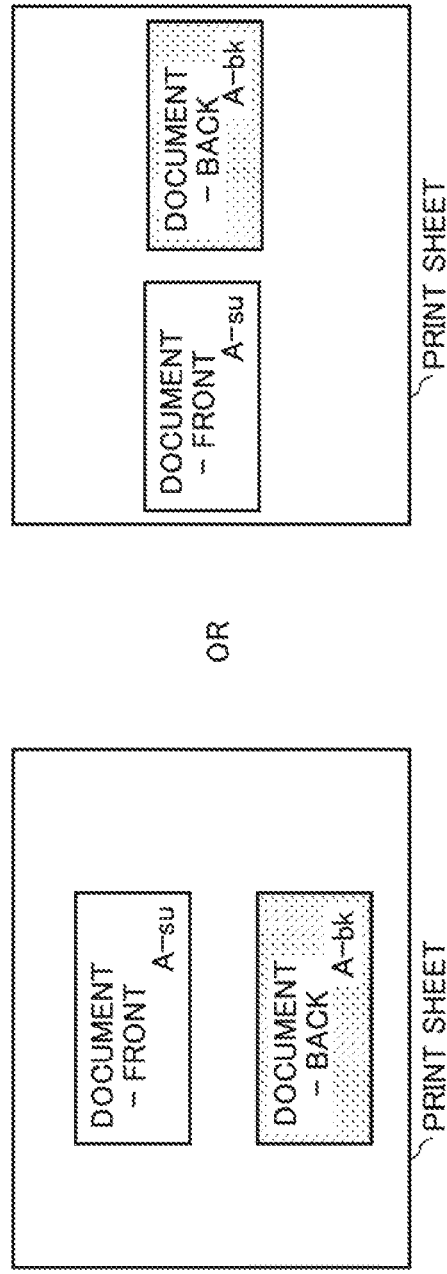
FIG.10 PRINT FRONT/BACK SURFACES ON ONE SHEET

FIG.11 1ST READING (HORIZONTALLY AND VERTICALLY ARRANGED DOCUMENTS MIXED)

FIG.11A

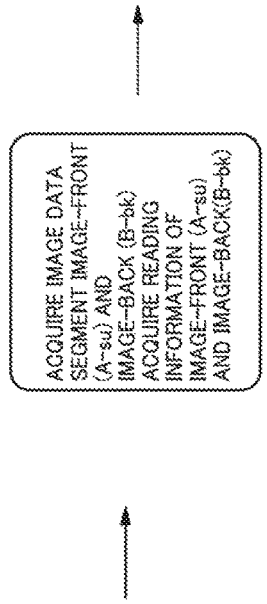

FIG.11B

ACQUIRE IMAGE DATA
SEGMENT IMAGE-FRONT (A-su) AND IMAGE-BACK (B-bk)
ACQUIRE READING INFORMATION OF IMAGE-FRONT (A-su) AND IMAGE-BACK (B-bk)

FIG.11C

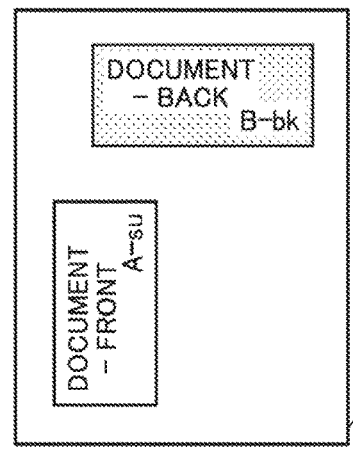

DETERMINE ARRANGEMENT AND FRONT/BACK OF IMAGE-FRONT (A-su) AND IMAGE-BACK (B-bk)
GENERATE FRONT/BACK DETERMINATION INFORMATION OF IMAGE-FRONT (A-su) AND IMAGE-BACK (B-bk)
(A-su: HORIZONTAL ARRANGEMENT, FRONT SURFACE)
(B-bk: VERTICAL ARRANGEMENT, BACK SURFACE)
DOCUMENT IDENTIFICATION NO.
SET G01 TO A-su
SET G02 TO B-bk

FIG.11D

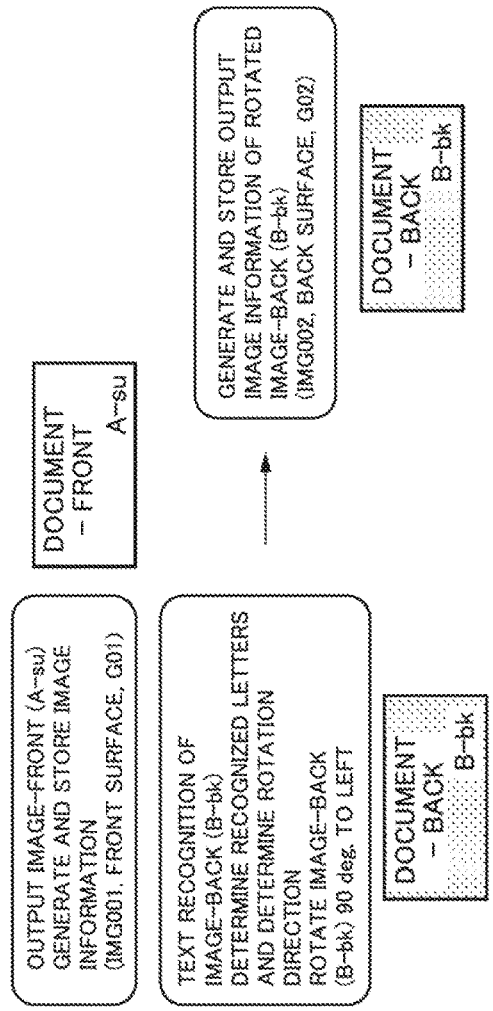

OUTPUT IMAGE-FRONT (A-su)
GENERATE AND STORE IMAGE INFORMATION
(IMG001, FRONT SURFACE, G01)

TEXT RECOGNITION OF IMAGE-BACK (B-bk)
DETERMINE RECOGNIZED LETTERS AND DETERMINE ROTATION DIRECTION
ROTATE IMAGE-BACK (B-bk) 90 deg. TO LEFT GENERATE AND STORE OUTPUT IMAGE INFORMATION OF ROTATED IMAGE-BACK (B-bk)
(IMG002, BACK SURFACE, G02)

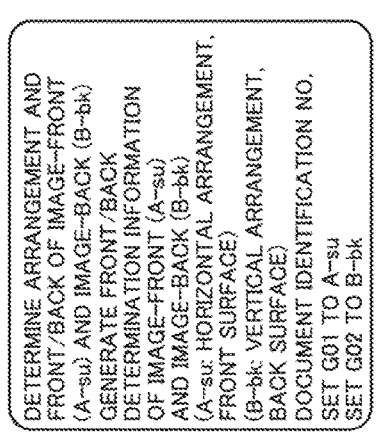

FIG.12 2ND READING (HORIZONTALLY AND VERTICALLY ARRANGED DOCUMENTS MIXED)

FIG.12A

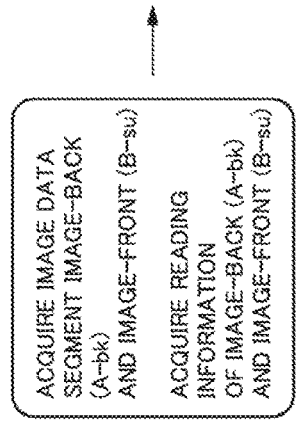

(READING AREA OF DOCUMENT TABLE)

FIG.12B

ACQUIRE IMAGE DATA
SEGMENT IMAGE-BACK
(A-bk)
AND IMAGE-FRONT (B-su)

ACQUIRE READING
INFORMATION
OF IMAGE-BACK (A-bk)
AND IMAGE-FRONT (B-su)

FIG.12C

DETERMINE FRONT/BACK
OF IMAGE-BACK (A-bk)
AND IMAGE-FRONT (B-su)
GENERATE FRONT/BACK
DETERMINATION INFORMATION
OF IMAGE-BACK (A-bk)
AND IMAGE-FRONT (B-su)
(A-bk: VERTICAL ARRANGEMENT,
BACK SURFACE)
(B-su: HORIZONTAL ARRANGEMENT,
FRONT SURFACE)
DETERMINE IMAGE POSITION BASED
ON MIDPOINT OBTAINED FROM
APEX POSITION COORDINATES
AND ASSOCIATE IMAGES OF
FRONT AND BACK SURFACES
(A-su AND A-bk)
(B-su AND B-bk)
SET DOCUMENT IDENTIFICATION NO.
G01 FOR A-bk
G02 FOR B-su

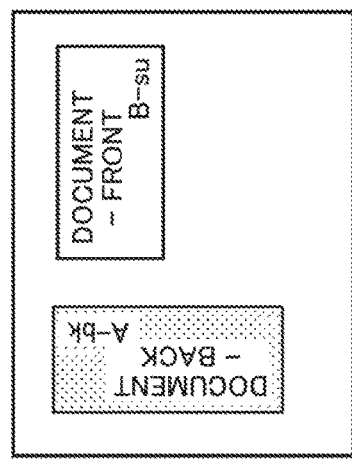

FIG.12D

TEXT RECOGNITION ON
IMAGE-BACK (A-bk)
DETERMINE RECOGNIZED LETTERS
AND DETERMINE ROTATION
DIRECTION
ROTATE IMAGE-BACK (A-bk)
90 deg. RIGHT OUTPUT OF IMAGE-FRONT (B-su)
GENERATE AND STORE IMAGE
INFORMATION
(IMG014, FRONT SURFACE, G02)

GENERATE AND STORE OUTPUT
IMAGE INFORMATION OF ROTATED
IMAGE-BACK (A-bk)
(IMG013, BACK SURFACE, G01)

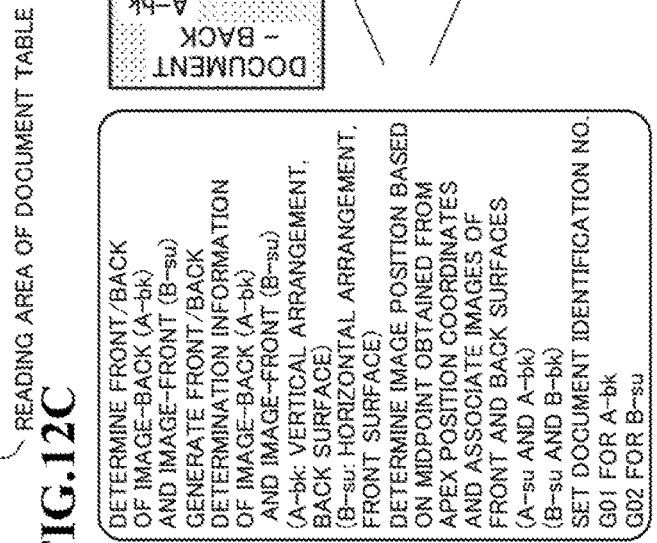
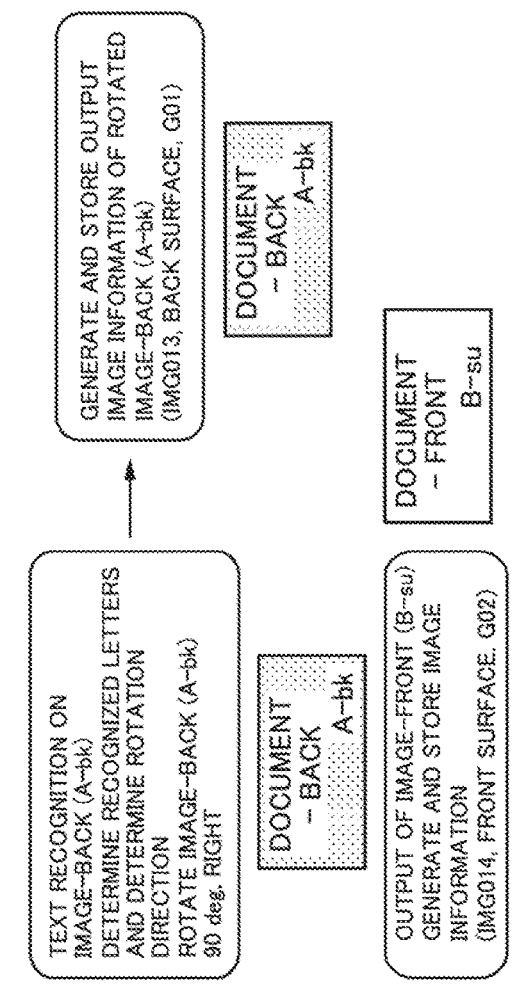

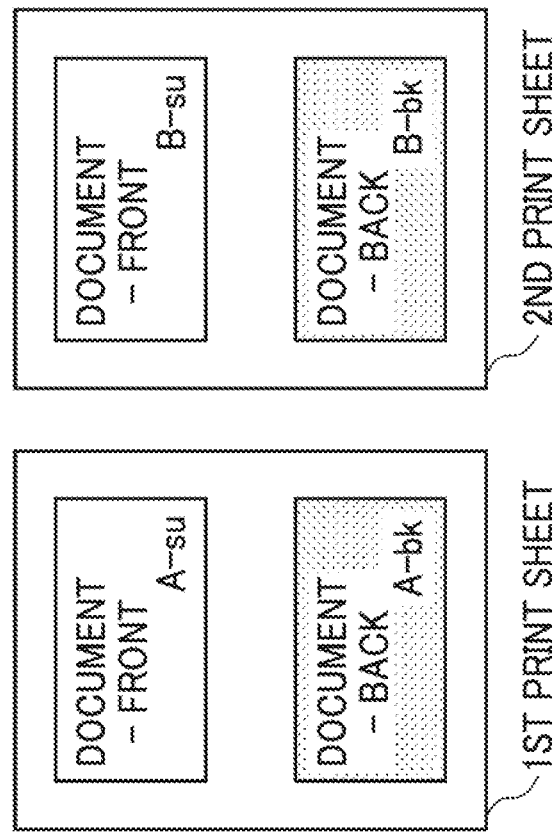
FIG.13 PRINT FRONT/BACK SURFACES ON ONE SHEET

IMAGE PROCESSING APPARATUS BEING ABLE TO SIMULTANEOUSLY READ AND EXTRACT IMAGE DATA

BACKGROUND OF THE INVENTION

1. Technical Field

The invention relates to an image processing apparatus, and more particularly to an image processing apparatus capable of simultaneously reading a plurality of documents and extracting image data of each document from the read image data.

2. Description of the Background Art

Image forming apparatuses have been conventionally used and, recently, multifunction peripherals capable of scanning documents and connecting to a network in addition to duplicating documents are used. Some multifunction peripherals, for example, are capable of scanning a plurality of documents, such as double-sided printed documents, business cards, license cards, other documents and cards with images etc. printed on both sides, arranged on a document table so as not to overlap one another, reading the entire image data including image data of the plurality of documents, and extracting a plurality of pieces of independent image data corresponding to each document from the read entire image data (hereinafter, referred to as multi-crop scanning).

Japanese Unexamined Patent Application Publication No. 2008-92451 describes a scanner system which scans one or more documents arranged on a document table by means of multi-crop scanning, extracts scanned data for each document, obtains the center of gravity of each piece of extracted scanned data, determines an area to which the center of gravity belongs, stores the scanned data of each document in a storage destination folder previously associated with that area, or alternatively, prescans the documents to acquire positions of the documents, adjusts image reading conditions such as a reading resolution depending on the positions, and then reads the documents again.

Japanese Unexamined Patent Publication No. 2009-100211 describes an image reading apparatus that separately reads the entire image data of front surfaces and back surfaces of a plurality of documents on which images etc. are provided on both sides, such as business cards and postcards, arranged on a document table, extracts image data of the front surface and image data of the back surface of each document, and outputs image data of the front surface and image data of the back surface located at the same position as one piece of image data in which the front surface and the back surface of a single document are integrated.

SUMMARY OF THE INVENTION

In conventional apparatuses, if a plurality of imaginary reading areas is previously defined by dividing an arrangement surface of a document table, a user needs to arrange each document within the previously defined reading area when arranging a plurality of documents on the document table. In Japanese Unexamined Patent Application Publication No. 2008-92451, a user needs to previously sets storage destination folders to associate with each reading area on the document table, and when a plurality of documents is to be arranged on the document table, the user needs to arrange the documents while being conscious of the folder setting with respect to each area. This procedure in preparation of scanning imposes heavy load to the user.

In Japanese Unexamined Patent Publication No. 2009-100211 in which the front surfaces and the back surfaces are separately read, since the order of scanning is previously fixed, e.g., the front surfaces are scanned in a first scan and the back surfaces are scanned in a second scan, a user needs to arrange the documents while being conscious of whether the document is on the front surface or the back surface and the order of reading of each document. Therefore, when the user arranges a plurality of documents on the document table, the front surfaces and the back surfaces cannot appear at the same time for each scanning. This procedure in preparation including arrangement imposes heavy load to the user.

The invention has been made in view of the above circumstances, and an object thereof is to provide an image processing apparatus capable of, when reading image data on both surfaces of a document on which images etc. are provided on both surfaces, acquiring image data on both surfaces of the document with easy operation without preparation for reading with consciousness of whether the document arranged on a document table is on the front surface or the back surface or the order of a front surface and a back surface of a document to read, thereby reducing the operation burden of the user.

According to an embodiment of the invention, an image processing apparatus includes: a document table on which at least one document is arrangeable; an image input unit that reads the document arranged on the document table; an individual image extractor that extracts image data read by the image input unit on a document basis to obtain image data of an individual image; a storage which stores association information between an arrangement status of the document with respect to the document table and a reading surface of the document to be read by the image input unit; an arrangement status determiner that determines the arrangement status of the document with respect to the document table on the basis of the image data of the individual image; and a reading surface determiner that determines the reading surface of the document read by the image input unit on the basis of the association information and the arrangement status determined by the arrangement status determiner.

The arrangement status of the document with respect to the document table is a horizontal arrangement and a vertical arrangement; the reading surface of the document is front and back surfaces of the document; and the association information is used to associate the horizontal arrangement and the vertical arrangement with the front surface and the back surface.

A reading area of the document table is rectangular in shape and the document is rectangular in shape; and the arrangement status determiner detects the direction of a long side of the document with respect to the reading area of the document table from the image data of the individual image, and when the long side of the document is substantially parallel to a long side of the reading area of the document table, the arrangement status determiner determines that the arrangement status of the document with respect to the document table is the horizontal arrangement and when the long side of the document is substantially parallel to a short side of the reading area of the document table, determines that the arrangement status of the document with respect to the document table is the vertical arrangement.

When the arrangement status determiner determines that the document is arranged horizontally, the reading surface determiner determines that the reading surface of the read document is the reading surface associated with the horizontal arrangement in accordance with the association information and, when the arrangement status determiner determines that the document is arranged vertically, the reading surface determiner determines that the reading surface of the read document is the reading surface associated with the vertical arrangement in accordance with the association information.

The image processing apparatus further includes an image position determiner that determines a central position of the document corresponding to the individual image on the basis of the read image data, compare the central position of the document read in first reading by the image input unit and the central position of the document read in second reading by the image input unit, and determine whether these two documents are the same in accordance with a comparison result.

The image position determiner determines that the two documents are the same when a distance between the central position of the document read in the first reading and the central position of the document read in the second reading is shorter than a predetermined distance.

The storage stores output method setting information used to set an output method of image data of the individual image; and the image processing apparatus further comprises an output unit that outputs image information from the image data of the individual image in accordance with the output method setting information, wherein the output unit outputs the image data of the individual images, which are determined to be the same document by the image position determiner, in association with each other.

The image processing apparatus further includes: a text recognizer that recognizes text of the individual image and determine a direction of the text included in the individual image; and an image rotator that rotates the individual image in accordance with a determination result of the text recognizer and turn the text recognized by the text recognizer to a predetermined direction, wherein the output unit generates the image information from the individual image rotated by the image rotator and outputs the generated image information.

An image processing method, which includes: reading at least one document arranged on a document table by an image input unit; extracting image data read by the image input unit on a document basis to obtain image data of an individual image; storing, in storage, association information between an arrangement status of the document with respect to the document table and a reading surface of the document to be read by the image input unit; determining the arrangement status of the document with respect to the document table on the basis of the image data of the individual image; and determining a reading surface of the document read by the image input unit on the basis of the association information stored in the storage and the determined arrangement status.

The reading by the image input unit includes first reading for reading a first surface of the document and second reading for reading a second surface of the document; the extracting of the individual image includes extracting at least one piece of image data read in the first reading on a document basis as a first individual image and extracting at least one piece of image data read in the second reading on a document basis as a second individual image; the determining of the arrangement status includes determining the arrangement status on the basis of at least one piece of image data as the first individual image and determining the arrangement status on the basis of at least one piece of image data as the second individual image; the determining of the reading surface determines whether the at least one reading surface of the document read in the first reading and the second reading is the first surface or the second surface on the basis of the arrangement status and the association information; and the image processing method further includes: determining a central position of the document corresponding to the first individual image and a central position of the document corresponding to the second individual image on the basis of at least one piece of the first image data and at least one piece of the second image data, and comparing the determined central positions; determining whether the document corresponding to the first individual image and the document corresponding to the second individual image are the same in accordance with a comparison result, and outputting the image data of the first individual image and the image data of the second individual image, which are determined to be the same document, in association with each other.

Effect of the Invention

According to the invention, individual images of one or a plurality of collectively read documents is extracted, arrangement of documents arranged on a document table with respect to the document table is determined from the extracted individual images, and whether a reading surface of the document arranged on the document table is a front surface or a back surface is determined from the determined document arrangement by using front/back arrangement setting information in which document arrangement with respect to the document table and the front surface and the back surface which are reading surfaces of the document are associated with each other. Therefore, when reading a front surface and a back surface of a document, it is possible to acquire individual images on the front surface and the back surface of the document with easy operation without preparation for reading while being conscious of the front surface and the back surface of the document to be arranged on a document table or the order of the front surface and the back surface of the document to read, thereby reducing the operation load of the user.

BRIEF DESCRIPTION OF THE DRAWINGS

FIG. 1 is a configuration block diagram of an embodiment of an image processing apparatus according to the invention.

FIGS. 5A to 5F are explanatory diagrams of an embodiment of information used in the image processing apparatus of the invention.

FIGS. 6A and 6B are explanatory diagrams of an embodiment of information used in the image processing apparatus of the invention.

FIGS. 7A to 7F are explanatory diagrams of an embodiment of information used in the image processing apparatus of the invention.

FIGS. 8A to 10 are explanatory diagrams of an embodiment of document reading and printing in the image processing apparatus of the invention.

FIGS. 11A to 13 are explanatory diagrams of an embodiment of document reading and printing in the image processing apparatus of the invention.

DETAILED DESCRIPTION OF THE INVENTION

Figure 2A:
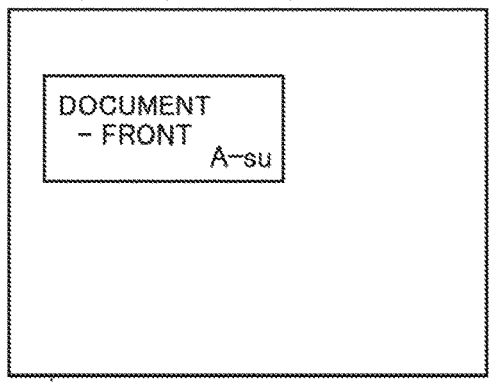
FIGS. 2A to 2E are explanatory diagrams of an embodiment of document arrangement in the image processing apparatus of the invention.

Hereinafter, embodiments of the invention will be described with reference to the drawings. It should be noted that the invention is not limited by the following description of the embodiments.

Structure of Image Processing Apparatus

FIG. 1 is a configuration block diagram of an embodiment of an image processing apparatus of the invention.

An image processing apparatus (hereinafter, referred to also as a multifunction peripheral (MFP)) 1 is a device for processing image data, and is an electronic device having functions of, for example, copying, printing, reading documents (scanning), transmitting/receiving facsimile, telecommunication, etc. Especially in the invention, predetermined image processing is executed by using the document reading function. In order to execute the document reading function, the image processing apparatus includes a document table on which the document to read is arranged. One or a plurality of documents is arranged on the document table so that the documents are positioned within a reading area of the document table. When a user performs predetermined reading start operation, information described on one of surfaces of the documents is read as an image.

In FIG. 1, the image processing apparatus (MFP) 1 of the invention mainly includes a controller 11, an operation unit 12, an image input unit 13, a display unit 14, an output unit 15, an individual image extractor 16, a document arrangement determiner 17, a front/back determiner 18, an image position determiner 19, a text recognizer 20, a rotation direction determiner 21, an image rotator 22, an output image generator 23, and a storage 50.

The controller 11 controls operation of each constituent element such as an image input unit, and is mainly implemented by a microcomputer including a CPU, ROM, RAM, an I/O controller, and a timer. The CPU organically operates various types of hardware based on a control program stored in advance in the ROM etc. and executes an image input function, an output image generation function, etc. of the invention.

The operation unit 12 is used for inputting information like text, and for selecting and inputting functions. The operation unit 12 is, for example, a keyboard, a mouse, or a touch panel.

The image input unit 13 is used for inputting image information, and in the invention, is a part for collectively reading one or a plurality of documents arranged on a document table. For example, information about a document on which images, text, graphics, etc. are described is input in the image input unit 13. The input information is stored as electronic data in the storage 50. As the image input unit 13, a scanner (reading device) for reading a document on which information is printed (hereinafter, referred to as a document) is used. There are various methods for inputting image information. For example, documents on which information is printed are scanned with a scanner, and electronic data in the entire reading area of the document table including the documents is stored in the storage 50 as entire input image data.

However, the method for inputting information like images is not limited to that described above. For example, an interface for connecting to an external storage medium such as a USB flash drive corresponds to the image input unit 13. An electronic data file such as an image or a document to input may be stored in an external storage medium like a USB flash drive, the USB flash drive etc. may be connected to an input interface like a USB terminal, and predetermined input operation may be performed in the operation unit 12, whereby a desired electronic data file stored in the USB flash drive etc. may be read out and stored as electronic data in the storage 50.

In general, when a document is scanned with a scanner, a user arranges the document on a predetermined document table (referred also to as a document arrangement table) and performs input operation indicating start of reading. When reading is started, usually, the entire reading area (reading surface) of the document table is read as one piece of electronic data. When the size of the documents is smaller than the reading area of the document table, the read electronic data (entire image data) includes not only images of documents but also information of portions at which no document exist. In the invention, as will be described later, the individual image extractor 16 extracts the image data (individual images) of the portion where the documents exist from one piece of read electronic data.

The reading area of the document table is usually about the size of A4-size paper or A3-size paper. Therefore, regarding documents of which size is significantly smaller than the size of the reading area of the document table, such as business cards, postcards, photographs, insurance cards, credit cards, etc., a plurality of them can be arranged on the document table so as not to overlap one another. When a plurality of documents arranged on the document table is read with a scanner, the read information is generated and stored as one piece of electronic data. In this case, since one piece of electronic data includes image data of a plurality of documents (individual images), image data of a plurality of documents (individual images) is extracted from one piece of read electronic data.

In the invention, image data of a plurality of documents (individual images) contained in one piece of electronic data is respectively extracted, whether each document is on the front surface or the back surface is determined by utilizing a difference in document arrangement, and, for example, images on the front surface and the back surface of a single document are output on one sheet of paper collectively as one piece of image information.

The display unit 14 is a portion for displaying information, and displays information necessary for executing each function, a result of execution of the function, etc. to notify a user. The display unit 14 is, for example, a liquid crystal display (LCD), an organic electroluminescence (EL) display, etc. When a touch panel is used as the operation unit 12, the display unit 14 and the touch panel are superimposed.

The output unit 15 outputs image information generated from individual images, and corresponds to, for example, a printer that prints and outputs image information to a paper medium. The output unit 15 composes the individual image of the first surface and the individual image of the second surface, which are associated as image information of the front surface and the image information of the back surface of a single document, and outputs the composed image as one piece of image information. For example, as will be described later, the individual image on the front surface and the individual image on the back surface of the single read document are composed and printed on a single sheet. However, the output of information is not limited to printing, and may be storage of information in an external storage medium such as a USB flash drive or transmission of information to another information processing apparatus or a server via a network like the Internet.

The individual image extractor 16 extracts individual images of one or a plurality of collectively read documents. That is, image data of a part of the read document is extracted from the entire image data input by the image input unit 13. The image data of a part of the read document is called an individual image. If the number of documents to read is one, the image data of a part where that a single document exists is extracted from the entire input image data.

If a plurality of documents is arranged on the document table and read, since the input entire image data includes image data corresponding to a plurality of documents, image data of a part where each of a plurality of documents exists is extracted. For example, when four documents are arranged on the document table and read, the image data corresponding to each of the four documents is extracted. The function of extracting the individual image by the individual image extractor 16 corresponds to so-called multi-crop scanning, and a conventionally used technique may be used.

The document arrangement determiner 17 determines, from the extracted individual images, document arrangement on the document table with respect to the document table. In the following embodiments, it is assumed that there are horizontal arrangement and vertical arrangement in document arrangement on the document table, and the document arrangement determiner 17 determines whether the documents on the document table are arranged horizontally or vertically. In the invention, arrangement of documents is determined in order to distinguish the front surfaces and the back surfaces of the documents from the document arrangement. As will be described later, when the user intentionally arranges a document horizontally, for example, the read surface of the document is determined to be the front surface, and when the user intentionally arranges a document vertically, the read surface of the document is determined to be the back surface. That is, before determining whether the read surface of the document is the front surface or the back surface, document arrangement is first determined automatically.

Generally, there are various sizes and shapes of documents to read. In the invention, in principle, the size of the documents is smaller than the reading area of the document table, and the shape of the documents is rectangular. However, the documents may be polygonal having long sides and short sides of different lengths, or may be elliptical. Further, it is assumed that the documents each have a front surface and a back surface which are reading surfaces, and is a planar object on which text or images are described on at least one of the front surface and the back surface. The reading area of the document table is rectangular.

Figure 2B:
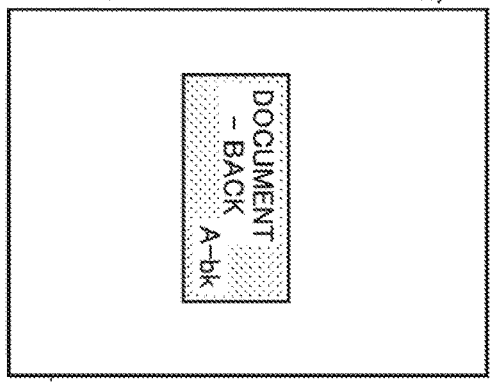

As illustrated in FIG. 2A to be described later, if the reading area of the document table is a rectangular in shape, the long sides thereof are along the horizontal direction, and the short sides thereof are along the vertical direction, arrangement of a rectangular document with its long sides being parallel to long sides of the reading area of the document table and its short sides being parallel to short sides of the reading area of the document table is referred to as "horizontal arrangement." As illustrated in FIG. 2B to be described later, if the reading area of the document table is a rectangular in shape, the long sides thereof are along the vertical direction, and the short sides thereof are along the horizontal direction, arrangement of a rectangular document with its long sides being parallel to the short sides of the reading area of the document table and its short sides being parallel to the long sides of the reading area of the document table is referred to as "vertical arrangement."

Regarding determination as to whether the document is arranged horizontally or vertically, first, the document arrangement determiner 17 detects the direction of the long sides of the document with respect to the reading area of the document table from the extracted individual image. When the document is arranged on the document table such that the long sides of the document are substantially parallel to the long sides of the reading area of the document table, the arrangement of the document with respect to the document table is determined to be horizontal arrangement. When the document is arranged on the document table such that the long sides of the document are substantially parallel to the short sides of the reading area of the document table, it is determined that document arrangement with respect to the document table is vertical arrangement.

More specifically, after reading the document, positions of four apexes of the individual image of the extracted document are obtained, and then, from the relative position between the direction of the long sides of the document and the direction of the long sides of the reading area of the document table, document arrangement with respect to the document table can be obtained. If an XY coordinate system in which the direction of the long sides of the reading area is the direction of an X axis direction and the direction of the short sides of the reading area is the direction of a Y axis with respect to the reading area of the document table is used, for example, positions of the four apexes of the document arranged on the document table can be represented by the X coordinate and the Y coordinate of this XY coordinate system. The lengths of the four sides of the rectangular document are obtained from the X and Y coordinates representing the positions of these four apexes, and the directions of the long sides and the short sides of the document with respect to the XY coordinate system can be known.

For example, if the direction of the long sides of the document in the XY coordinate system substantially coincides with the direction of the long sides of the reading area of the document table, this means that document arrangement is as illustrated in FIG. 2A and is determined to be "horizontal arrangement." On the contrary, if the direction of the long sides of the document in the XY coordinate system substantially coincides with the direction of the short sides of the reading area of the document table, this means that document arrangement is as illustrated in FIG. 2B and is determined to be "vertical arrangement."

However, when the user arranges the documents himself or herself, it is difficult to arrange the documents with the long sides of the documents being exactly parallel to the long sides of the reading area of the document table, and the user often arranges the documents with the long sides slightly inclined with respect to the long sides of the reading area of the document table. Therefore, for example, when an angle between the direction of the long side of the document and the direction of the long side of the reading area of the document table is smaller than ±45 degrees, it is considered that the user had intended to arrange the document in the manner as illustrated in FIG. 2A, and it is desirable to determine that document arrangement is "horizontal arrangement." When an angle between the direction of the long side of the document and the direction of the long side of the reading area of the document table is larger than ±45 degrees, it is considered that the user had intended to arrange the document in the manner as illustrated in FIG. 2B, and it is desirable to determine that document arrangement is "vertical arrangement."

The front/back determiner 18 determines whether the reading surface of the document arranged on the document table is the front surface or the back surface based on the document arrangement determined by the document arrangement determiner 17 by using front/back arrangement setting information described later. The determination as to whether the document is on the front surface or the back surface can be made by using the determination result of document arrangement determined by the document arrangement determiner 17 and front/back arrangement setting information 51 stored in advance in the storage 50. As will be described later, the front/back arrangement setting information 51 is set such that the front surface and the back surface of the document are previously associated with the vertical direction and the horizontal direction of the arrangement.

When the document arrangement determiner 17 determines that the document arrangement with respect to the document table is horizontal arrangement, the front/back determiner 18 determines the reading surface of the read document as a reading surface associated with the horizontal arrangement stored in the front/back arrangement setting information 51. When the document arrangement determiner 17 determines that the document arrangement with respect to the document table is vertical arrangement, the front/back determiner 18 determines the reading surface of the read document as a reading surface associated with the vertical arrangement stored in the front/back arrangement setting information 51.

For example, when the horizontal arrangement and the front surface of the document are stored in association with each other in the front/back arrangement setting information 51, and the determination result of the arrangement is horizontal arrangement, it is determined that the front surface of the document has been read. When the vertical arrangement and the back surface of the document are stored in association with each other in the front/back arrangement setting information 51, and the determination result of the arrangement is vertical arrangement, it is determined that the back surface of the document has been read. Therefore, for the determination as to whether the document is on the front surface or the back surface based on the setting of the relationship between arrangement and front/back of the document, the user needs to understand that it is necessary to horizontally arrange the document to cause the front surface of the document to read, and that it is necessary to vertically arrange the document to cause the back surface of the document to read.

However, setting of the relationship between arrangement and front/back of the document may be changed by the user. Contrary to the above setting, it is possible to set so that the horizontal document arrangement means that the back surface of the document has been read, and the vertical document arrangement means that the front surface of the document has been read.

Generally, a single document has two reading surfaces, i.e., the front surface and the back surface. In the invention, the front surface and the back surface of a single document are read by performing a reading process twice.

That is, in a first reading process, one of the reading surfaces of the front surface and the back surface (hereinafter, referred to as a first surface) is read, and in a second reading process, the other of the reading surfaces (hereinafter, referred to as a second surface) is read.

For example, if the number of documents to read is one, in order to read a predetermined first surface of the reading surfaces of the document, the document is arranged at an arbitrary position on the document table horizontally or vertically. After the first surface is read with the image input unit 13, the document is turned over and arranged at an arbitrary position on the document table horizontally or vertically different from the direction in which the document is arranged for the reading of the first surface. Then, the second surface different from the first surface is read with the image input unit 13. Thereafter, an individual image on the read first surface and an individual image of the read second surface are extracted with the individual image extractor 16, whereby the extracted individual image of the first surface and the extracted individual image of the second surface can be associated as image information about the front surface and the back surface of a single document.

If there is a plurality of documents to read, in order to read a predetermined first surface of each document among the reading surfaces of a plurality of documents, a plurality of documents is arranged horizontally or vertically on the document table so as not to overlap one another. After reading the first surface of each document with the image input unit 13, each of a plurality of documents is turned over, and arranged horizontally or vertically different from the direction in which the document is arranged for the reading of the first surface at substantially the same position on the document table as when the first surface was read. Then, the second surfaces different from the first surfaces of the plurality of documents are read with the image input unit 13. Then, individual images on the read first surfaces of the plurality of documents and individual images on the read second surfaces of the plurality of documents are extracted with the individual image extractor 16, whereby the individual image of the first surface and the individual image of the second surface of the document arranged at substantially the same position on the document table can be associated with each other as image information of the front surface and the back surface of a single document.

If there is a plurality of documents to read, the first surface to read in the first reading process does not necessarily have to be the front surface nor the back surface regarding all the documents. The front surfaces and the back surfaces may appear at the same time: for example, among a plurality of documents, several documents are on the front surface and the remaining documents are on the back surface. Similarly, the front surfaces and the back surfaces of a plurality of documents to read in the second reading process may appear at the same time: for example, several documents are on the front surface and the remaining documents are on the back surface.

The image position determiner 19 determines whether the position of the document corresponding to each individual image on the read first surface and the position of the document corresponding to each individual image on the read second surface are substantially the same. Further, as will be described later, the image position determiner 19 compares the center position of each individual image of the first surface of the plurality of documents with the center position of each individual image of the second surface of the plurality of documents. When a distance between the center position of the individual image of the first surface and the central position of the individual image of the second surface is shorter than a predetermined distance, the image position determiner 19 determines that the position of the document corresponding to the individual image of the first surface and the position of the document corresponding to the individual image of the second surface are substantially the same, and then determines that the document of the individual image of the first surface and the document of the individual image of the second surface, which are determined to be located at substantially the same position, are the same document.

For example, the image position determiner 19 determines whether the position of the horizontally arranged document in the first reading process and the position of the vertically arranged document in the second reading process are substantially the same with respect to the document table or whether these positions are within a predetermined area. Determination of the positions of the images may be mainly performed when two or more documents are arranged on the document table and a plurality of documents is simultaneously read.

When two or more documents are to be arranged on the document table, each of these documents is arranged such that the position of first reading and the position of second reading of the same document are substantially the same. Alternatively, regarding a single document, the center position of the horizontally arranged document and the center position of the vertically arranged document are disposed to be shorter than a predetermined distance L0. That is, for example, in a case where the user horizontally arranges a document A, performs first reading and then second reading of the document A, the user turns over and vertically arranges the document A at substantially the same position where the document A was horizontally arranged.

Here, the predetermined distance L0 cannot be uniquely specified as an appropriate numerical value but, for example, may be set to be about 10 cm. Since an appropriate numerical value may vary depending on the size of documents to read etc., a user may change the setting of the predetermined distance L0 for determining positions of images.

If the number of documents to read is one, the number of individual image to be extracted in one reading process is one. Therefore, positions of images may not determined and, even if the position of the horizontally arranged document and the position of the vertically arranged document are greatly different, it may be determined that the individual image of the front surface and the individual image of the back surface have been read regarding a single document.

The position of an image is determined by using the central position obtained from the four apexes of the individual image extracted as described above. When a document is rectangular, the center of the rectangle is at the intersection of the diagonal lines. Therefore, from the X and Y coordinates of the four apexes, the X coordinate and the Y coordinate of the center position are obtained by calculation by using a predetermined formula. For example, when two documents are arranged so as not to overlap each other to perform first reading, the coordinates of the center position of the individual image is obtained from the four apexes of each of the two individual images. When the two documents are turned over and arranged so as not to overlap each other at second reading, similarly, the coordinates of the center position are obtained from the four apexes of each of the two individual images.

The coordinates of the center position of the individual image obtained at first reading and the coordinates of the center position of the individual image obtained at second reading are compared with each other. When a distance between the coordinates of the center position of the individual image obtained at first reading and the coordinates of the center position of the individual image obtained at second reading is shorter than the predetermined distance L0, it is determined that the document of the individual image obtained at first reading and the document of the individual image obtained at second reading are the same documents. Alternatively, a distance between the coordinates of the center position of the individual image obtained at first reading and the coordinates of the center position of the individual image obtained at second reading may be calculated, and two documents of which distance between the center positions of the individual images is the shortest may be determined to be the same documents.

For example, when reading the front surfaces and the back surfaces of the document A and a document B, the front surfaces are read at first reading. If these two documents, the document A and the document B, are arranged horizontally not to overlap each other, coordinates Pa1 of the center position are obtained from the individual image of the document A and coordinates Pb1 of the center position are obtained from the individual image of the document B. Since the back surfaces are read at second reading, the user turns over the document A and the document B, and vertically arranges the document A at substantially the same position as the document A at first reading. The user vertically arranges the document B at substantially the same position as the position of the document B at first reading, whereby two documents are arranged not to overlap each other. Then, when the second reading is performed, the coordinate Pa2 of the center position is obtained from the individual image of the document A, and the coordinate Pb2 of the center position is obtained from the individual image of the document B.

The two coordinates (Pa1, Pb1) obtained at first reading are compared with the coordinates (Pa1, Pb2) of the two centers obtained at second reading, and whether the distance from the center coordinates is shorter than the predetermined distance L0 is determined. For example, if the center coordinates Pa1 and the center coordinates Pa2 are shorter than the predetermined distance L0, it is determined that the individual image having the center coordinate Pa1 and the individual image having the center coordinate Pa2 exist in a predetermined area and that these two individual images are the front surface and the back surface of a single document A. Similarly, if the center coordinates Pb1 and the center coordinates Pb2 are shorter than a predetermined distance, it is determined that the individual image having the center coordinate Pb1 and the individual image having the center coordinate Pb2 exist in a predetermined area and that these two individual images are the front surface and the back surface of a single document B.

As described above, by comparing the position of the individual image at first reading and the position of the individual image at second reading, it is possible to associate the image data of the front surface with the image data of the back surface of the same document. For example, it is desirable to provide the same document identification number to the image data of the front surface and the image data of the back surface to indicate the same document as will be described later.

However, if the distance between the center coordinates obtained at first reading (Pa1, Pb1) and the center coordinates obtained at second reading (Pa1, Pb2) is longer than the predetermined distance L0, no individual image of which center coordinates exist within the predetermined area, and it cannot be determined that these individual images are the individual images of the same document. Therefore, the user is notified that a reading error has occurred, and that the reading operation is to be performed again with the documents arranged so that the document position of the first reading and the document position of the second reading are substantially the same position.

The text recognizer 20 recognizes text about each individual image extracted by the individual image extractor 16 and determines direction of the recognized text included in each individual image. Since text may be included in the document to read, the text is recognized and, regarding the extracted individual image, the text direction is determined. The text recognition and the determination of the text direction are performed mainly to output, in the same direction, the text direction of the horizontally arranged and read documents and the text direction of the vertically arranged and read documents.

For example, if the text direction on the horizontally arranged and read documents is an upper direction, which is the same as the upper direction of the document table (which text direction is referred to as an upper direction of the text), text direction of that document when vertically arranged and read is right or left with respect to the document table. That is, since the text direction of the horizontally and read document (front surface) and the text direction of the vertically arranged and read document (back surface) differ by 90 degrees, when a horizontally arranged and read document (front surface) and a vertically arranged and read document (back surface) are printed on the same paper sheet, the paper sheet is output in a state in which the user is not easily read the documents because the text directions of the documents are different.

Therefore, for example, when the read image data of the vertically arranged and read individual document is rotated 90 degrees, the documents can be printed with the text direction of the vertically arranged and read document and the text direction of the horizontally arranged and read document being aligned to the same direction, which allows the user easily read the front surface and the back surface.

Reading illustrated in FIG. 2A indicates that, after text recognition, the text direction of the horizontally arranged and read document is upward with respect to the document table. Reading illustrated in FIG. 2B indicates that, after text recognition, the text direction of the vertically arranged and read document is right with respect to the document table.

However, it is not always the case that the text direction of the horizontally arranged and read document is upward with respect to the document table. Text direction of some horizontally arranged and read documents may be right or downward with respect to the document table. In the following embodiments, for the ease of explanation, in principle, it is assumed that the text direction of the horizontally arranged and read document is upward with respect to the document table and the text direction of the vertically arranged and read document is right or left direction with respect to the document table.

The rotation direction determiner 21 determines a rotation direction and a rotation angle of the individual image so that the text direction of the read individual document is upward with respect to the document table. As described above, after the text recognizer 20 recognizes the text, the text direction of the vertically arranged and read individual document is determined to be right or left with respect to the document table.

If the text direction of the vertically arranged and read individual document is determined to be right with respect to the document table, the image data of the individual document is rotated 90 degrees to the left (rotation 90 degrees left), whereby the text direction of the individual document becomes upward with respect to the document table. That is, the text recognizer 20 determines that the text direction of the vertically arranged and read individual document is right with respect to the document table, the rotation direction of the individual image is determined to be 90 degrees to the left.

For example, in the reading illustrated in FIG. 2B, since the text direction of the vertically arranged and read individual document is right with respect to the document table, the rotation direction of the individual image is determined to be 90 degrees to the left. If the text direction of the vertically arranged and read individual document is determined to be left with respect to the document table, the rotation direction of the individual image is 90 degrees to the right (rotation 90 degrees right).

When the text direction of the horizontally arranged and read individual document is determined to be downward with respect to the document table, in order to align the text direction upward, it is desirable to determine the rotation direction of the horizontally arranged and read individual image to 180 degrees. Therefore, regardless of whether the document is arranged horizontally or vertically, the rotation direction and the rotation angle of the individual image are desirably determined so that the text direction of the recognized text becomes upward with respect to the document table.

The image rotator 22 rotates the image data of the individual document in the direction determined by the rotation direction determiner 21 by the determined rotation angle. As a result, the image data of the individual document is changed such that the text direction of the read individual document is upward with respect to the document table.

In the above description, the case where the image data is rotated so that the text direction of the individual document becomes upper with respect to the document table is described. However, in general, the image rotator 22 may rotate each individual image so that the text direction recognized in the individual images with respect to all the read documents face the same predetermined direction. For example, the text direction of all the individual documents may be rotated to be right with respect to the document table. When the rotation is performed in this manner, the output unit 15 outputs the image information generated from each individual image in which the recognized text direction faces the predetermined same direction. In this manner, when the documents are output with the directions of the recognized text in each individual image being aligned to the same predetermined direction, the user can easily read the text written on the front/back surfaces of the document.

For example, in the reading illustrated in FIG. 2B, if the rotation direction of the vertically arranged and read individual document is determined to be 90 degrees to the left, the image data of the individual document is rotated 90 degrees to the left. In this case, the text direction of the vertically arranged and read individual document (back surface) is upward that is the same as that of the text direction of the horizontally arranged and read individual document (front surface) as illustrated in FIG. 2A, and for example, as illustrated in FIG. 2E, the text directions of the horizontally arranged and read individual document (front surface) and the vertically arranged and read individual document (back surface) are aligned and printed on a single print sheet. The image data of the individual document may be rotated by 180 degrees so that the text direction of the read individual document becomes upward with respect to the document table.

The output image generator 23 generates output image information from information about the individual image read by two reading operations (read information) and front/back determination information indicating document arrangement and a front/back determination result of the document. As will be described later, the output image information includes, for each input individual image, a document identification number, a front/back determination result of the reading surface, and image data, for example. The image data of the individual image set in the output image information is output by the output unit 15 on the basis of previously set output method setting information. As described above, the output is performed in the form of printing, storage in an external storage medium, transmission to a server, etc.

The storage 50 stores information and programs necessary for executing each of functions of the image processing apparatus of the invention. The storage 50 includes a semiconductor storage element such as ROM, RAM and flash memory, a storage device such as an HDD and an SSD, and other storage medium. The storage 50 stores, for example, front/back arrangement setting information 51, output method setting information 52, read information 53, front/back determination information 54, output image information 55, etc. FIGS. 5A to 5F, FIGS. 6A and 6B, and FIGS. 7A to 7F are explanatory diagrams of an embodiment of information stored in the storage 50 of the image processing apparatus.

The front/back arrangement setting information 51 is information in which the document arrangement with respect to the document table and the front surface and the back surface as the reading surface of the document are associated with each other. As described above, when the documents are to be arranged horizontally or vertically with respect to the document table, one of the reading surfaces of the document (i.e., the front surface or the back surface) is associated with the horizontal arrangement and the other of the reading surfaces, which is different from that reading surface associated with the horizontal arrangement, is associated with the vertical arrangement in the front/back arrangement setting information 51.

FIG. 5A illustrates an embodiment of the front/back arrangement setting information 51. FIG. 5A illustrates information in which the reading surface (front surface and back surface) of the document and document arrangement on the document table are stored in association with each other. The front/back arrangement setting information 51 may be previously stored in a fixed manner or the user may change the setting.

For example, the "front surface" of the reading surfaces of the document is associated with "horizontal arrangement" as arrangement, and reading the "front surface" of the document means arranging the document horizontally on the document table. That is, when a document is arranged horizontally with respect to the document table, the "front surface" of the document the document is to be read. The "back surface" of the reading surfaces of the document is associated with "vertical arrangement" as arrangement, and reading the "back surface" of the document means arranging the document vertically on the document table. That is, when a document is arranged vertically with respect to the document table, the "back surface" of the document the document is to be read.

Therefore, in the case where the front/back arrangement setting information 51 is set as illustrated in FIG. 5A, when the user intends to have the "front surface" of that document to be read, the user needs to arrange the document with the "front surface" being the reading surface, and needs to arrange the document, which is rectangular, "horizontally" with the long sides being substantially parallel to the long sides of the document table as illustrated in FIG. 2A. When the user intends to have the "back surface" of the document to be read, the user needs to arrange the document with the "back surface" being the reading surface, and as illustrated in FIG. 2B, needs to arrange the document, which is rectangular, "vertically" with the long sides being substantially parallel to the short sides of the document table.

The output method setting information 52 is information in which a method for outputting the read individual image is previously set. When there is a plurality of types of output methods, the user may select and input which one of the output methods to use. Alternatively, one of the output methods may be previously set as an initial value. FIG. 5B illustrates an embodiment of the output method setting information 52. Here, the case where four output methods are previously set is illustrated, and the user selects and inputs any one of these four output methods before performing document reading operation.

Figure 4A:
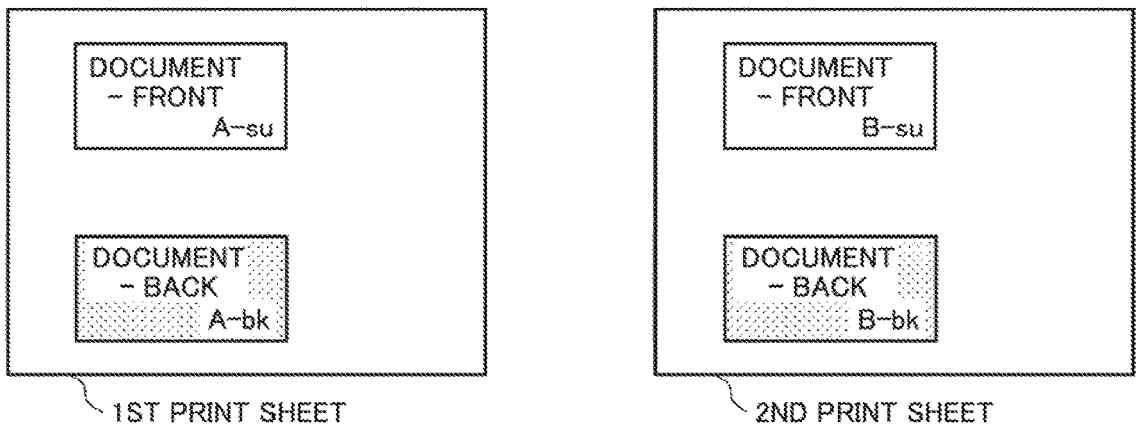
FIGS. 4A to 4C are explanatory diagrams of an embodiment of a document printing method in the image processing apparatus of the invention.

For example, the output method of No. 1 is outputting front/back image in composition. Selecting this output method indicates integrating the front surface and the back surface of each document, composing data, and outputting as a single piece of image data. In this case, as illustrated in FIG. 4A, for example, image data of the front surface and image data of the back surface of the same document are composed and printed on a single print sheet.

Figure 4B:
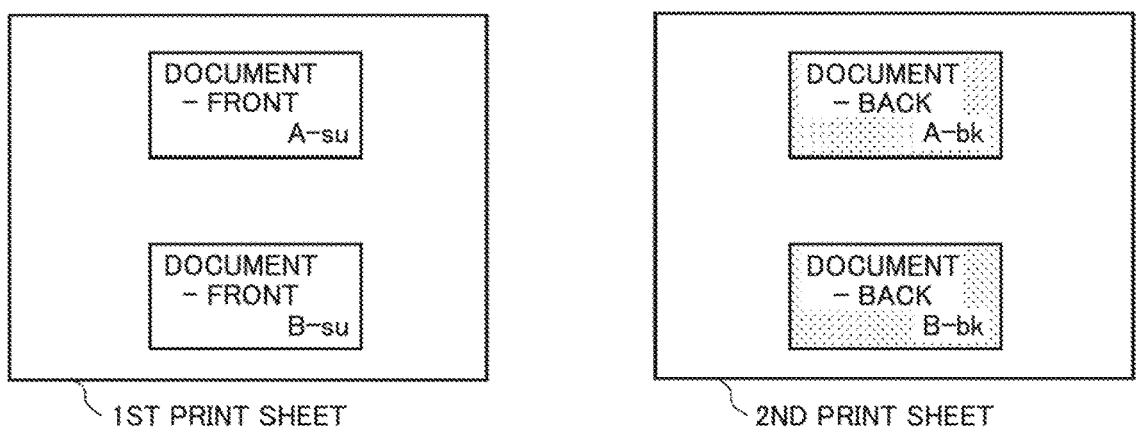

The output method of No. 2 is outputting front/back images separately. Selecting this output method indicates that image data of the read front surface and image data of the read back surface are composed into a separate single piece of image data and output. That is, image data of the front surfaces of a plurality of documents is composed into one piece of image data, and separately, image data of the back surfaces of a plurality of documents is composed into one piece of image data. In this case, for example, as illustrated in FIG. 4B, the image data of the front surfaces of a plurality of documents is composed and printed on a single print sheet, and the image data of the back surfaces of a plurality of documents is printed on another print sheet.

Figure 4C:
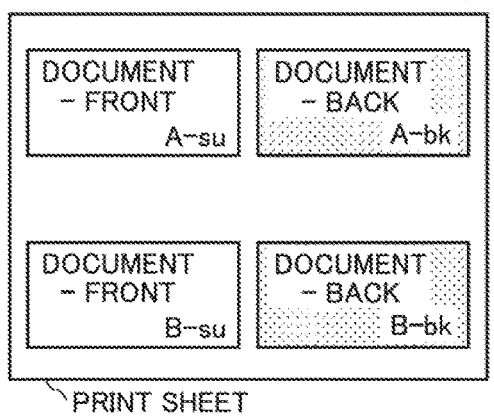

The output method of No. 3 is outputting all images in composition on the same paper sheet. Selecting this output method indicates that, for all the read documents, image data of the front surface and image data of the back surface are composed into a single piece of image data, and output to one paper sheet. In this case, as illustrated in FIG. 4C, for example, image data of a front surface and image data of a back surface of two different documents are composed and printed on a single print sheet.

The output method of No. 4 is outputting input images separately. Selecting this output method indicates that acquired individual images are output separately regarding the read documents. In this case, image data of the front surface and the image data of the back surface of the same document are output to different paper sheets.

The read information 53 stores information about image data acquired respectively in two reading operations. FIG. 5C illustrates an embodiment of the read information 53. For example, a piece of read information includes a reading number, an input image number, document apex position coordinates, a horizontal length, a vertical length, a midpoint position, and image data.

The reading number indicates the times of reading. For example, "1" is set for image data acquired at first reading, and "2" is set for image data acquired at second reading. The input image number indicates the number provided to an individual image extracted from image data of the entire image acquired by one reading operation. When a plurality of documents is arranged and read simultaneously, a plurality of individual images is extracted and each extracted individual image is provided with a different number.

The document apex position coordinates are an XY coordinate value indicating the position of a extracted individual image and is an XY coordinate value in the XY coordinate system set in the reading area of the document surface. When the document is rectangular, the document consists of XY coordinate values at the four apexes of the rectangle. The horizontal length of the document is a length in the horizontal direction of the rectangle specified by the XY coordinate values of the four apexes and indicates a length in the direction of the long sides of the reading area of the document surface. The vertical length of the document is a length in the vertical direction of the rectangle specified by the XY coordinate values of the four apexes and indicates a length in the direction of the short sides of the reading area of the document surface.

The midpoint position is the central position of the rectangle specified by the XY coordinate values of the four apexes, and an intersection point of the diagonal lines of the rectangle specifying the individual image corresponds to the midpoint and indicates the center of the individual image. The image data is information written on the document read by the scanner, and is stored for each extracted individual image.

FIG. 5C illustrates an example of the image data acquired at first reading and an example of the image data acquired at second reading. For example, the read information of which reading number is SC01 is information acquired at first reading. That information is stored in a file of which input image number of the extracted individual image is N01, the image data of the extracted individual image is named IMG001. Four apexes (P1, P2, P3, P4) of the rectangle that specifies the extracted individual image, a horizontal length L1, a vertical length L2, and a midpoint position P5 of the rectangle are obtained.

The read information of which reading number is SC02 is information acquired at second reading. That information is stored in a file of which input image number of the extracted individual image is N02, the image data of the extracted individual image is named IMG002. Four apexes (P6, P7, P8, P9) of the rectangle that specifies the extracted individual image, a horizontal length L6, a vertical length L7, and a midpoint position P10 of the rectangle are obtained.

FIGS. 6A and 6B are explanatory views of the reading surface of the document corresponding to the read information of FIG. 5C. FIG. 6A illustrates a state in which a single document is arranged horizontally on the document table, and also illustrates the relationship with the read information acquired by performing the first reading. A horizontally arranged document A-su is illustrated on the left side of FIG. 6A of which front surface is to be read. Four apexes (P1, P2, P3, P4) of the document A-su, the position of the midpoint P5, a position of the horizontal length L1 parallel to the horizontal direction (direction of the long sides) of the document table, and a position of the vertical length L2 parallel to the longitudinal direction (short side direction) are illustrated on the right side. In FIG. 6A, it is assumed that the upward direction of the text written on the front surface of the horizontally arranged document A-su coincides with the upward direction of the document table.

Furthermore, FIG. 6A illustrates a comparison result of the lengths between the horizontal length L1 and the vertical length L2 (L1>L2) and, document arrangement is determined from the comparison result of the length. From this comparison result of the length (L1>L2), the document A-su is determined to be horizontally arranged with respect to the document table. If the front/back arrangement setting information is set as illustrated in FIG. 5A above, since the document arrangement is determined to be horizontal arrangement, the front/back determination of the reading surface is performed to be "front surface" based on the front/back arrangement setting information. The comparison result of the length, the determination of document arrangement, and the front/back determination of the reading surface are part of the front/back determination information described later.

FIG. 6B illustrates a state in which the document read in FIG. 6A is turned over and that document is vertically arranged on the document table, and also illustrates a relationship with the read information acquired by performing the second reading. FIG. 6B illustrates, on the left side, a vertically arranged document A-bk of which back surface is to be read. An upper direction of the text written on the back surface of the document corresponds to the right direction of the document table. The right side of FIG. 6B illustrates the four apexes (P6, P7, P8, P9) of the document A-bk, the position of the midpoint P10, a position of the horizontal length parallel to the horizontal direction (direction of the long sides) L6, and a position of the vertical length L7 parallel to the longitudinal direction (direction of the short sides) of the document table.

Furthermore, FIG. 6B illustrates a comparison result of the length of the horizontal length L6 and the vertical length L7 (L6<L7), and document arrangement is determined from the comparison result of the length. From this comparison result of the length (L6>L7), the document A-bk is determined to be vertically arranged with respect to the document table. If the front/back arrangement setting information is set as illustrated in FIG. 5A above, since the document arrangement is determined to be vertical arrangement, the front/back determination of the reading surface is performed to be "back surface" based on the front/back arrangement setting information.

When it is determined that the upward direction of the text (text direction) is right with respect to the document table as a result of recognition of text written on the back surface of the document, it is determined to rotate the image data of the document A-bk 90 degrees to the left in order to make the upward direction of the text written on the back surface of the document coincide with the upward direction of the text written on the front surface of the document (upward direction of the document table). The result of the comparison of the lengths, the document arrangement determination, the front/back determination of the reading surface, the text direction, and the rotation direction are part of the front/back determination information described later.

The front/back determination information 54 indicates the document arrangement obtained from the read information 53 and the determination result on the front surface and the back surface described above. FIG. 5D illustrates an embodiment of the front/back determination information 54. Here, one piece of the front/back determination information is composed of input image number, comparison of the length, determination on document arrangement, front/back determination of the reading surface, text direction, rotation direction, and document identification number. FIG. 5D illustrates the front/back determination information 54 obtained corresponding to the two input image numbers illustrated in FIG. 5C.

For example, a document of which input image number is N01 corresponds to the document read in FIG. 6A, as described above, the length comparison is L1>L2, the document arrangement is determined to be horizontal, and the front/back of the reading surface is determined to be front. A document of which input image number is N02 corresponds to the document read in FIG. 6B, as described above, the length comparison is L6<L7, the document arrangement is determined to be vertical, the front/back of the reading surface is determined to be back, the text direction is right, and the rotation direction is set to 90 degrees to the left.

In the case of FIGS. 6A and 6B, since the number of documents arranged on the document table is one, it is determined that the document arranged horizontally at first reading and the document vertically arranged at second reading are the same documents, and that the two pieces of acquired image data are the image data of the front surface and the image data of the back surface of the same document. Therefore, since the document of which input image number is N01 and the document of which input image number is N02 are the same, the same document identification number G01 is provided to the front/back determination information 54 of the two pieces of image data.

The output image information 55 is generated by the output image generator 23 and is used when outputting individual images acquired by two reading operations. The output image information 55 is assumed to be composed of the information included in the read information 53 and the front/back determination information 54. FIG. 5E illustrates an embodiment of the output image information 55. Here, the output image information 55 includes an input image number, a document identification number, a front/back determination of the reading surface, and image data.

When the output image information 55 is composed of the read information 53 etc., the output image information 55 does not generate new information. Therefore, when outputting an individual image, it is desirable to read information necessary for the output and generate the output image information 55 from among the stored read information 53 and the front/back determination information 54. The two pieces of output image information illustrated in FIG. 5E is a part of information read from the information included in the read information 53 illustrated in FIG. 5C and the front/back determination information 54 illustrated in FIG. 5D. These two pieces of output image information show that the two pieces of read image data (IMG001, IMG002) are image data of the front surface and the back surface of the same document.

When an image is to be printed by using these two pieces of output image information, if the above-described output method setting information 52 is previously set to the No. 1 "outputting front/back images in composition," for example, as illustrated in the output print sheet example of FIG. 5F, the image data of the front surface (IMG001) and the image data of the back surface (IMG002) of the same document are composed and printed on a single sheet.

FIGS. 7A to 7F are explanatory diagrams of information acquired when two documents are arranged on the document table and individual images of two documents are simultaneously read. FIG. 7A illustrates a state in which two documents are arranged not to overlap each other on the document table, and the first reading has been performed. FIG. 7B illustrates a state in which the two documents are turned over after the first reading, the two documents are arranged so as not to overlap each other on the document table, and the second reading has been performed.

In this case, one piece of entire image data including the image data of the two documents is first acquired in one reading operation. Then, with a extraction process of the individual images as described above, image data of each individual image of the two documents is extracted. That is, image data of two individual images (IMG011, IMG012) is extracted from one piece of entire image data acquired at first reading, and image data of two individual images (IMG013, IMG014) is extracted from one piece of entire image data acquired at second reading.

In FIG. 7A, in the first reading, it is assumed that a document of which input image number is N11 and acquired image data is IMG011 is arranged horizontally and an image on the front surface is read, and that a document of which input image number is N12 and acquired image data is IMG012 is arranged vertically and an image on the back surface is read. Further, text is written on the document of which image data is IMG011 and an upper direction of the text faces upward. Text is written also on the document of which image data is IMG012, and an upper direction of the text faces the right.

The lower drawing of FIG. 7A illustrates the positions of some apexes and midpoints of two documents. A midpoint P5 of the document of which image data is IMG011 and the position of the midpoint P10 of the document of image data IMG012 are substantially different from each other and the two pieces of image data do not overlap each other.

In FIG. 7B, in the second reading, it is assumed that a document of which input image number is N13 and acquired image data is IMG013 is arranged vertically and an image on the front surface is read, and that a document of which input image number is N14 and acquired image data is IMG014 is arranged horizontally and an image on the back surface is read. Text is written also on the document of which image data is IMG013, and an upper direction of the text faces the left. Further, text is written on the document of which image data is IMG014 and an upper direction of the text faces upward.

The lower drawing of FIG. 7B illustrates the positions of some apexes and midpoints of two documents. A midpoint P15 of the document of which image data is IMG013 and the position of the midpoint P20 of the document of image data IMG014 are substantially different from each other and the two pieces of image data do not overlap each other. The distance between the midpoint P5 of the document of which image data is IMG011 of FIG. 7A and the midpoint P15 of the document of which image data is IMG013 of FIG. 7B is shorter than the distance L0 used in the determination of the image position. Similarly, the distance between the midpoint P10 of the document of which image data is IMG012 of FIG. 7A and the midpoint P20 of the document of which image data is IMG014 of FIG. 7B is shorter than the distance L0 used in the determination of the image position.

FIG. 7C illustrates read information of two documents. In FIG. 7A, when the first reading is performed, the image data (IMG011, IMG012) of two input image numbers (N11, N12) to which the reading number SC01 is provided indicating that the reading is the first reading is acquired, the document apex position coordinates of the four apexes corresponding to that image data, the horizontal length (L1, L3), the vertical length (L2, L4), and the midpoint position (P5, P10) are calculated, and stored in the storage 50.

Thereafter, in FIG. 7B, when the two documents are turned over and the second reading is performed, the image data (IMG013, IMG014) of two input image numbers (N13, N14) to which the reading number SC02 is provided indicating that the reading is the second reading is acquired, the document apex position coordinates of the four apexes corresponding to that image data, the horizontal length (L5, L7), the vertical length (L6, L8), and the midpoint position (P15, P20) are calculated, and stored in the storage 50.

FIG. 7D illustrates front/back determination information of two documents. On the basis of the read information stored as described above, the front/back determination information composed of the document arrangement, the front/back determination, etc. is generated for each input image number. Regarding the image data IMG011 of which input image number is N11, for example, since the comparison between the horizontal length (L1) and the vertical length (L2) is L1>L2, the horizontal length of this individual image is longer than the vertical length. Therefore, the arrangement is determined to be "horizontal arrangement." If the front/back arrangement setting information 52 is set as illustrated in FIG. 5A, since the arrangement is determined to be "horizontal arrangement," the front/back determination of the reading surface is determined to be "front surface."

Regarding the image data IMG012 of which input image number is N12, since the comparison between the horizontal length (L3) and the vertical length (L4) is L3>L4, the vertical length of this individual image is longer than the horizontal length. Therefore, the arrangement is determined to be "vertical arrangement," and the front/back determination of the reading surface is determined to be the "back surface" with reference to the front/back arrangement setting information 52. Further, as a result of text recognition on the image data IMG012 of which input image number is N12, if the text direction is right as illustrated in FIG. 7A, the direction of rotation is determined to be 90 degrees to the left in order to align the text direction with the horizontally arranged document.

In the first reading, the position of the midpoint between the image data IMG011 of which input image number is N11 and the image data IMG012 of which input image number is N12 is substantially different from each other, and these two pieces of image data do not overlap each other, these pieces of image data are determined to be image data of different documents, and are provided with different numbers as document identification numbers.

For example, G01 is provided as the document identification number to the image data IMG011 of which input image number is N11, and G02 is provided as the document identification number to the image data IMG012 of which input image number is N12.

Regarding the image data IMG013 of which input image number is N13, since the comparison between the horizontal length (L5) and the vertical length (L6) is L5>L6, the vertical length of this individual image is longer than the horizontal length. Therefore, the arrangement is determined to be "vertical arrangement," and the front/back determination of the reading surface is determined to be the "back surface" with reference to the front/back arrangement setting information 52. Further, as a result of text recognition on the image data IMG013 of which input image number is N13, if the text direction is left as illustrated in FIG. 7B, the direction of rotation is determined to be 90 degrees to the right in order to align the text direction with the horizontally arranged document.

Further, the position of the midpoint P5 and the position of the midpoint P15 are compared to determine, from the positions of the images, whether the documents are the same. As described above, when the distance between the midpoint P5 of the document of which input image number is N11 and image data is IMG011 of FIG. 7A and the midpoint P15 of the document of which input image number is N13 and image data is IMG013 of FIG. 7B is shorter than the distance L0 used in the determination of the image position, the horizontally arranged document of IMG011 and the vertically arranged document of IMG013 are determined to be the same document. In this case, regarding the document identification number of the image data of which input image number is N13, the same document identification number G01 as that of the image data of which input image number is N11 is provided.

Regarding the image data IMG014 of which input image number is N14, since the comparison between the horizontal length (L7) and the vertical length (L8) is L7>L8, the horizontal length of this individual image is longer than the vertical length. Therefore, the arrangement is determined to be "horizontal arrangement," and the front/back determination of the reading surface is determined to be the "front surface" with reference to the front/back arrangement setting information 52.

Further, the position of the midpoint P10 and the position of the midpoint P20 are compared to determine, from the positions of the images, whether the documents are the same. As described above, when the distance between the midpoint P10 of the document of which input image number is N12 and image data is IMG012 of FIG. 7A and the midpoint P20 of the document of which input image number is N14 and image data is IMG014 of FIG. 7B is shorter than the distance L0 used in the determination of the image position, the vertically arranged document of IMG012 and the horizontally arranged document of IMG014 are determined to be the same document. In this case, regarding the document identification number of the image data of which input image number is N14, the same document identification number G02 as that of the image data of which input image number is N12 is provided.

FIG. 7E illustrates output image information of two documents. Also here, similar to the output image information 55 illustrated in FIG. 5E, the output image information composed of an input image number included in the read information 53 and the front/back determination information 54, a document identification number, a front/back determination of the reading surface, and image data. As is shown in FIG. 7E, since the input image numbers N11 and N13 have the same document identification number G01, these two pieces of image data (IMG011, IMG013) are image data of the front surface and the image data of the back surface of the same document. Similarly, since the input image numbers N12 and N14 have the same document identification number G02, these two pieces of image data (IMG012, IMG014) are image data of the front surface and the image data of the back surface of the same document.

When an image is to be printed by using the output image information 55, if the above-described output method setting information 52 is previously set to the No. 1 "outputting front/back images in composition," the image data having the same document identification number may be read out from the output image information 55 of FIG. 7E, composed to be within one paper sheet, and printed. When the above-described output method setting information 52 is previously set to the No. 2 "outputting front/back images separately," the image data having the same front/back determination of the reading surface may be read out from the output image information 55 of FIG. 7E, composed to be within one paper sheet, and printed.

FIG. 7F illustrates an example of printing output sheets of two documents. Here, an example of printing when the output method setting information 52 is previously set to No. 1 "outputting front/back images in composition."

For example, in the output image information 55 of FIG. 7E, two pieces of image data (IMG011, IMG013) of which document identification number is G01 are read out and a composite image of the front surface and the back surface of the same document is printed on a first print sheet.

Further, two pieces of image data (IMG012, IMG014) of which document identification number is G02 are read out and a composite image of the front surface and the back surface of the same document is printed on a second print sheet. In this manner, a plurality of documents may be output to different output sheets and, regarding each of a plurality of documents, an image obtained by composing a front surface and a back surface can be printed on one sheet.

In FIGS. 7A to 7F, an embodiment in which two documents are read simultaneously has been described. However, when three or more documents are to be read simultaneously, similarly, a plurality of documents may be arranged on the document table such that first reading surfaces differ from second reading surfaces, and reading may be performed twice. In FIGS. 7A to 7F, an embodiment in which two documents are arranged at different directions, that is, an embodiment in which front surfaces and back surfaces appear at the same time as the reading surfaces has been described. However, it is unnecessary that the front surfaces and the back surfaces appear at the same time. For example, in the first reading, all the plurality of documents may be vertically arranged and the back surfaces of all the documents may be read, and in the second reading, all the plurality of documents may be arranged horizontally and the front surfaces of all the documents may be read.

Example of Reading Operation and Image Processing

In the invention, two reading operations are performed in order to read the front surface and the back surface of the document. Hereinafter, several embodiments of reading operations and image processing when different numbers of documents are arranged will be described. Here, when the front/back arrangement setting information 51 is set such that the document is arranged horizontally when the front surface of the document is to be read, and the document is arranged vertically when the back surface of the document is to be read.

Embodiment 1-1

FIGS. 2A to 2E are explanatory diagrams of document arrangement when a single document is to be read. FIGS. 8A to 10 are explanatory diagrams of an embodiment of image processing and print processing after reading a document. FIG. 2A illustrates an example of document arrangement when first document reading is performed. In this case, in order to make the front surface A-su of a single document be read, the user horizontally arranges the document at an arbitrary position in the reading area of the document table. FIG. 8A illustrates an example of the same document arrangement as in FIG. 2.

In FIG. 2A, "document-front" and "A-su" are illustrated to indicate that the surface is the front surface of the document. The "document-front" also indicates the text direction on the front surface. In FIG. 2A, the upper direction of the text written on the front surface of the document faces upward of the reading area of the document table. For the ease of explanation, the front surface of the document on which the "document-front" is written is illustrated to be visible. Actually, however, the document is arranged such that the front surface of the document is to be read with the scanner.

In FIG. 2A, it is assumed that the user inputs operation indicating start of reading, and executes a reading process with the document arranged horizontally. In this case, as illustrated in FIG. 6A above, the read information 53 is acquired and the front/back determination information 54 is generated. First, as illustrated in FIG. 8B, the image input unit 13 scans the entire reading area of the document table, and acquires image data of the entire reading area. Further, an image on the front surface A-su of the document on which "document-front" is written is extracted by the individual image extractor 16, the image data IMG001 of this document is stored and, as illustrated in FIG. 6A, the read information 53 including the position coordinates of the apexes of the document is acquired.

Next, as illustrated in FIG. 8C, after the document arrangement determiner 17 determines document arrangement by using the acquired read information 53, the front/back determiner 18 determines front/back determination of the reading surface of the document by using the front/back arrangement setting information 51. Further, G01 is set as the document identification number. As a result, as illustrated in FIG. 6A, front/back determination information 54 of the document is generated.

Next, as illustrated in FIG. 8D, the output image generator 23 generates the output image information 55 of the document by using the read information 53 and the front/back determination information 54. With the processing described above, the first reading is ended and the image data IMG001 of the extracted individual image is stored as the front surface of the document G01.

FIG. 2B illustrates an example of document arrangement when second document reading is performed. In this case, in order to make the back surface A-bk of the same single document be read, the user turns over the document and vertically arranges the document at an arbitrary position in the reading area of the document table. The user does not necessarily have to care about the position to arrange the document at this time, and it is not necessary for the user to arrange the position substantially the same as the position of the first document.

Since the number of documents is one in this embodiment, the number of pieces of image data when the individual image is to be extracted is one. Therefore, the individual image extracted at first reading and the individual image extracted at second reading can be regarded as image data of the same document. Therefore, it is unnecessary to confirm the position of the document as in the case of making a plurality of documents be read simultaneously. The position at which the back surface A-bk of the first document at second reading may be significantly different from the position at which the front surface A-su of the document at first reading within the reading area of the document table.

In FIG. 2B, "document-back" and "A-bk" are illustrated to indicate that the surface is the back surface of the document. The "document-back" also indicates the text direction on the back surface. In FIG. 2B, the upper direction of the text written on the back surface of the document faces upward of the reading area of the document table.

For the ease of explanation, the back surface of the document on which the "document-back" is written is illustrated to be visible. Actually, however, the document is arranged such that the back surface of the document is to be read with the scanner. FIG. 9A illustrates an example of the same document arrangement as in FIG. 2B.

In FIG. 2B, it is assumed that the user inputs operation indicating a reading start and executes the reading process with the document arranged vertically. In this case, as illustrated in FIG. 6B above, the read information 53 is acquired and the front/back determination information 54 is generated. First, as illustrated in FIG. 9B, the image input unit 13 scans across the entire reading area of the document table and acquires image data of the entire reading area. Further, an image on the back surface A-bk of the document on which "document-back" is written is extracted by the individual image extractor 16, the image data IMG002 of this document is stored and, as illustrated in FIG. 6B, the read information 53 including the position coordinates of the apexes of the document is acquired.

Next, as illustrated in FIG. 9C, after the document arrangement determiner 17 determines document arrangement by using the acquired read information 53, the front/back determiner 18 determines front/back determination of the reading surface of the document by using the front/back arrangement setting information 51. Furthermore, since the number of extracted individual image is one, the document read the second time is regarded as the same document as the document read the first time, G01 is set as the document identification number. As a result, as illustrated in FIG. 6B, front/back determination information 54 of the document is generated.

Next, as illustrated in FIG. 9D, the text recognizer 20 recognizes text regarding the image data IMG002 on the back surface A-bk of the document. As a result of text recognition, it is determined that the upward direction of the text of the vertically arranged document faces the right of the reading area of the document table, the rotation direction determiner 21 determines that it is necessary to rotate the image data IMG002 to the left by 90 degrees in order to align the text direction with the front surface of the horizontally arranged document at first reading. Thereafter, the image rotator 22 rotates the image data IMG002 by 90 degrees to the left.

Next, as illustrated in FIG. 9E, the output image generator 23 generates the output image information 55 of the document by using the read information 53 and the front/back determination information 54. With the processing described above, the second reading is ended and the image data IMG002 of the extracted individual image is stored as the back surface of the document G01. The generated output image information 55 corresponds to the information illustrated in FIG. 5E.

When the user performs input operation indicating start of printing in order to print the image data of the front surface and the image data of the back surface of a single document read by the above two reading operations on a single print sheet. In this case, the text direction on the front surface and the back surface of a single document are aligned and, as illustrated in FIGS. 2E and 10, for example, the front surface and the back surface of a single document are composed and is printed on a single print sheet.

The positions on the front surface and the back surface to be printed may be arranged vertically as illustrated in FIG. 10 or horizontally. Alternatively, arrangement of printing on the front surface and the back surface may be specified and input by the user. Further, after the print image is displayed on the display unit 14, the user may perform input operation indicating the start of printing.

Embodiment 1-2

Figure 2C:
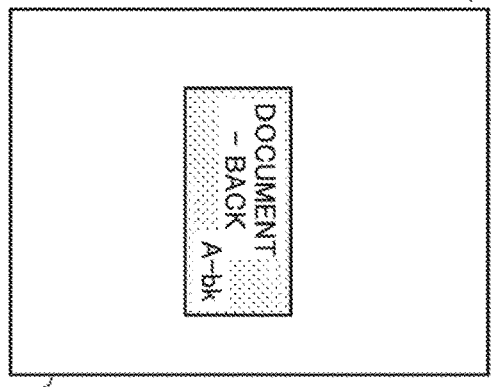
Figure 2D:
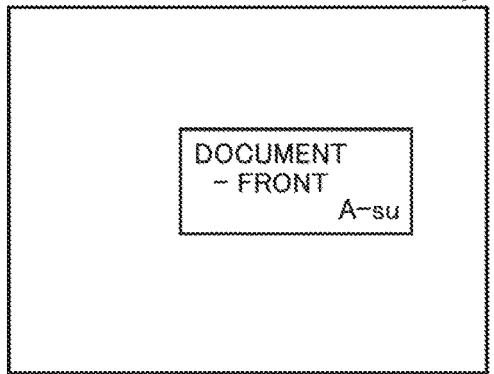
Figure 2E:
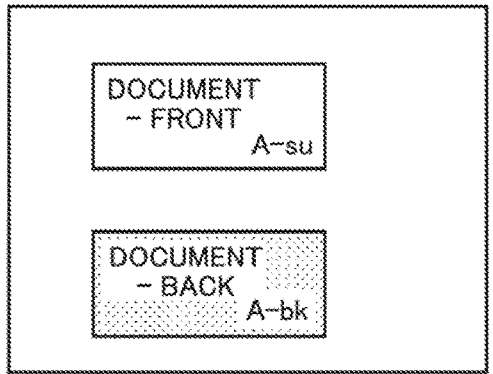

FIG. 2C illustrates an example of document arrangement when the first document reading is performed. In this case, in order to make the back surface A-bk of a single document be read, the user vertically arranges the document at an arbitrary position in the reading area of the document table. FIG. 2D illustrates an example of document arrangement when the second document reading is performed. In this case, in order to make the front surface A-su of a single document be read, the user turns over the document, and horizontally arranges the document at an arbitrary position in the reading area of the document table.

In this embodiment, the surface to read and the order of the document arrangement are different from those of the above-described embodiment 1-1. Also in this embodiment, when the image data of the front surface and the image data of the back surface of a single document read in the two reading operations as illustrated in FIG. 2C and FIG. 2D are printed on a single print sheet with the text direction on the front and back surfaces aligned with each other, similarly, as illustrated in FIG. 2E, the front surface and the back surface of a single document are composed and printed on print sheet.

Therefore, in the invention, the first reading operation is not fixed to the reading on the front surface of the document, and the second reading operation is not fixed to the reading of the back surface of the document. Which of the front surface and the back surface of the document may be read first. That is, the order of reading the surfaces on which the document is read may be arbitrarily determined.

In the invention, whether the reading surface is the front surface or the back surface can be distinguished by arranging the document horizontally or vertically. Therefore, it is desirable to display before the first reading, on the display unit 14 as guidance information for the user, explanation indicating that the document needs to be arranged horizontally with respect to the reading surface of the document table when the front surface of the document is to read and that the document needs to be arranged vertically with respect to the reading surface of the document table when the back surface is to read.

Embodiment 2-1

Figure 3A:
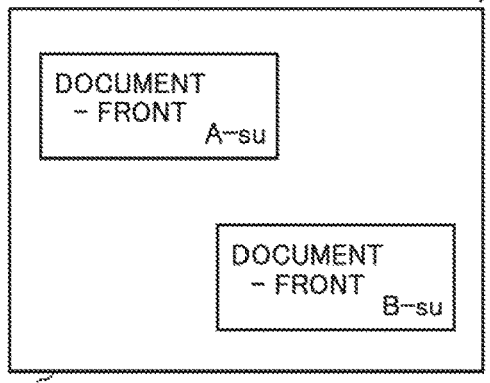
FIGS. 3A to 3F are explanatory diagrams of an embodiment of document arrangement in the image processing apparatus of the invention.

FIGS. 3A to 3F are explanatory diagrams of document arrangement when two documents are to be read. FIG. 3A illustrates an example of document arrangement when first document reading is performed. In this case, in order to make the front surfaces of the two documents to read (A-su, B-su), the user horizontally arranges both of these documents so as not to overlap each other in the reading area of the document table. Both of these two documents are arranged so that the upper direction of the text written on the front surface of the document faces upward in the reading area of the document table.

In FIG. 3A, when the user inputs operation indicating a reading start and executes the reading process with the document arranged horizontally, the individual images are extracted regarding the two documents as described above, the read information 53 of each document is acquired, and the front/back determination information 54 is generated.

For example, both documents are read as horizontally arranged documents and as the front surfaces, and different numbers are provided as document identification numbers.

Figure 3B:
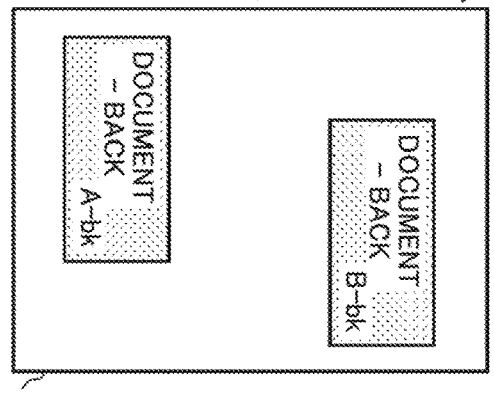

FIG. 3B illustrates an example of document arrangement when second document reading is performed. Here, in order to make the back surface A-bk of the document of which front surface is A-su be read, the user turns over this document and vertically arranges the document at a position as close as possible to the position at which the user arrange the document at first reading of the front surface A-su in the reading area of the document table. Similarly, regarding a document of which front surface is B-su, in order to make a back surface B-bk be read, the user turns over this document and vertically arranges the document at a position as close as possible to the position at which the user arrange the document at first reading of the front surface B-su in the reading area of the document table. Both of these two documents are arranged so that the upper direction of the text written on the back surface of the document faces the right in the reading area of the document table.

In FIG. 3B, when the user inputs operation indicating a reading start and executes the reading process with the document arranged vertically, the individual images are extracted regarding the two documents as described above, the read information 53 of each document is acquired, and the front/back determination information 54 is generated.

For example, both documents are read as vertically arranged documents and as the back surfaces, and different numbers are provided as document identification numbers. Since each of the two documents at second reading is set at a position as close as possible to the position at which the document is arranged at first reading, the same document identification number as that of the front surface A-su of the document is provided as the document identification number of the back surface A-bk of the document and the same document identification number as that of the front surface B-su of the document is provided as the document identification number of the back surface B-bk of the document.

Since the two documents read at second reading are vertically arranged and, as a result of text recognition, the upward direction of the text written on the back surface of the document faces the right of the reading area of the document table, the image data is rotated 90 degrees to the left in order to align the text direction with the text direction of the document read at first reading and stored. Further, the output image generator 23 generates the output image information 55 of the document by using the read information 53 obtained by the two reading processes and the front/back determination information 54.

Embodiment 2-2

Figure 3C:
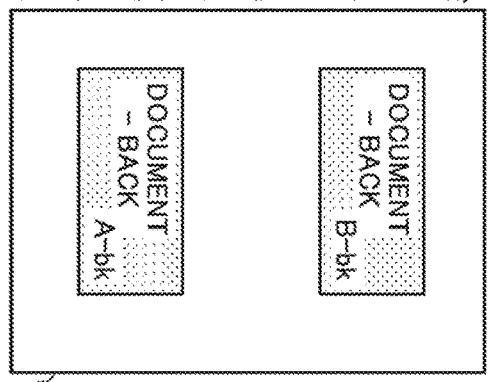

FIG. 3C illustrates an example of document arrangement when the first document reading is performed. In this case, in order to make the back surfaces of the two documents to read (A-bk, B-bk), the user vertically arranges both of these documents so as not to overlap each other in the reading area of the document table. Both of these two documents are arranged so that the upper direction of the text written on the back surface of the document faces the right in the reading area of the document table.

Figure 3D:
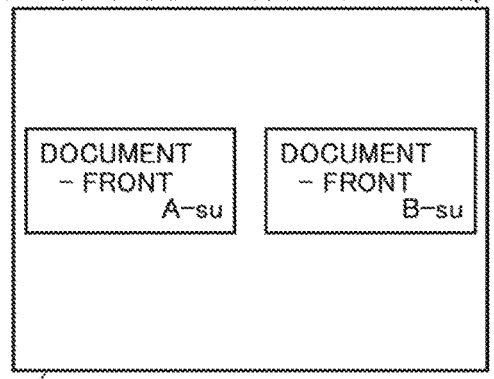

FIG. 3D illustrates an example of document arrangement when the second document reading is performed. In this case, in order to make the front surfaces of the two documents to read (A-su, B-su), the user horizontally arranges both of these documents so as not to overlap each other in the reading area of the document table. Both of these two documents are arranged so that the upper direction of the text written on the front surface of the document faces upward in the reading area of the document table.

In this embodiment, the surface to read and the order of the document arrangement are different from those of the above-described embodiment 2-1. The back surface of the document is read at first reading and the front surface of the document is read at second reading. Also in this embodiment, when the two reading processes are executed, as in the embodiment 2-1 described above, the individual images are extracted regarding the two documents, the read information 53 of each document is acquired, and the front/back determination information 54 is generated. Further, the output image information 55 of the document is generated by using the read information 53 obtained by the two reading processes and the front/back determination information 54.

Embodiment 2-3

Figure 3E:
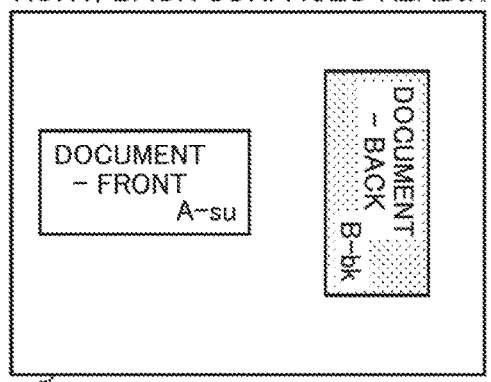

Here, a case in which a front surface and a back surface of two documents to read appear at the same time and the two documents are to be read simultaneously will be described. FIG. 3E illustrates an example of document arrangement when the first document reading is performed. FIGS. 11A to 13 are explanatory diagrams of an embodiment of image processing and print processing after reading a document.

In the first reading, in order to make the front surface A-su of one of the two documents be read and make the back surface B-bk of the other of the two documents be read, the user arranges the two documents so as not to overlap in the reading area of the document table, and arranges the document of which front surface is A-su horizontally and the document of which back surface is B-bk vertically. The document of which front surface is A-su is arranged so that the upper direction of the text written on the front surface of the document faces upward in the reading area of the document table. The document of which back surface is B-bk is arranged so that the upper direction of the text written on the back surface of the document faces the right in the reading area of the document table. FIG. 11A illustrates an example of the same document arrangement as in FIG. 3E.

Suppose that the user inputs operation indicating the start of reading and executes a reading process in a state in which two documents are arranged as illustrated in FIG. 3E. In this case, as illustrated in FIGS. 7A to 7F above, the read information 53 is acquired and the front/back determination information 54 is generated.

First, as illustrated in FIG. 11B, the image input unit 13 scans the entire reading area of the document table, and acquires image data of the entire reading area. Further, the individual image extractor 16 extracts an image on the front surface A-su of the document on which "document-front" is written and stores the image data IMG011 of this document and extracts an image on the back surface B-bk of the document on which "document-back" is written and stores the image data IMG012 of this document. Further, as illustrated in FIG. 7C, the read information 53 including the position coordinates of the apexes of the extracted individual images is acquired for each of the two documents. In FIG. 7C, regarding the first reading, SC01 is provided as the reading number, the input image number N11 is provided for the image data IMG011, and the input image number N12 is provided to the image data IMG012. The horizontal length, the vertical length, and the midpoint position of each screen data are also calculated.

Next, as illustrated in FIG. 11C, after the document arrangement determiner 17 determines arrangement of two documents by using the acquired read information 53, the front/back determiner 18 determines front/back determination of the reading surface of the two documents by using the front/back arrangement setting information 51. Since the two documents are arranged at different positions, different document identification numbers are provided. For example, G01 is provided as the document identification number to the document of which front surface is A-su, and G02 is provided as the document identification number to the document of which back surface is B-bk. As a result, regarding the image data of the front surface A-su and the back surface B-bk of the two documents, the front/back determination information 54 of the documents is generated as illustrated in FIG. 7D.

Next, as illustrated in FIG. 11D, regarding the image data IMG011 of the front surface A-su, the output image generator 23 first generates output image information 55 of the document by using the read information 53 and the front/back determination information 54. That is, when the output image information 55 illustrated in FIG. 7E is referred to, it is understood that the image data IMG011 of the input image number N11 is an image obtained by reading the front surface of the document of which document identification number is G01.

Regarding the image data IMG012 on the back surface B-bk, as illustrated in FIG. 11D, the text recognizer 20 recognizes the text. As a result of text recognition, it is determined that the upward direction of the text of the vertically arranged document faces the right of the reading area of the document table, the rotation direction determiner 21 determines that it is necessary to rotate the image data IMG012 to the left by 90 degrees in order to align the text direction on the back surface B-bk with the text direction of the horizontally arranged document of which front surface is A-su. Thereafter, the image rotator 22 rotates the image data IMG012 by 90 degrees to the left.

Further, regarding the image data IMG012 of the back surface B-bk, the output image generator 23 generates the output image information 55 of the document by using the read information 53 and the front/back determination information 54. That is, when the output image information 55 illustrated in FIG. 7E is referred to, it is understood that the image data IMG012 of the input image number N12 is an image obtained by reading the back surface of the document of which document identification number is G02. With the processing described above, the first reading is ended and the image data IMG011 of the extracted individual image is stored as the front surface of the document G01, and the image data IMG012 of the extracted individual image is stored as the back surface of the document G02.

Figure 3F:
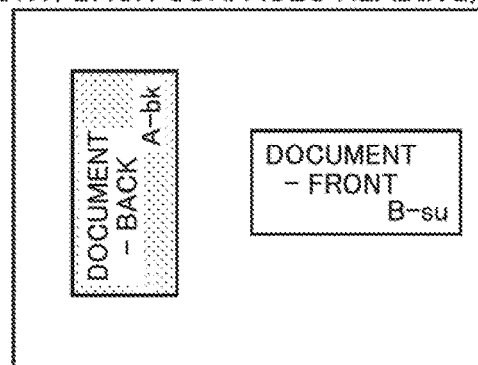

FIG. 3F illustrates an example of document arrangement when the second document reading is performed. In the second reading, in order to make the back surface A-bk of one of the two documents be read and make the front surface B-su of the other of the two documents be read, the user arranges the two documents so as not to overlap in the reading area of the document table, and arranges the document of which back surface is A-bk vertically and the document of which front surface is B-su horizontally.

Further, in order to make the back surface A-bk of the document of which front surface is A-su be read, the user turns over this document and vertically arranges the document at a position as close as possible to the position at which the user arrange the document at first reading of the front surface A-su in the reading area of the document table.

Similarly, regarding a document of which back surface is B-bk, in order to make a front surface B-su be read, the user turns over this document and horizontally arranges the document at a position as close as possible to the position at which the user arrange the document at first reading of the back surface B-bk in the reading area of the document table.

The document of which back surface is A-bk is arranged so that the upper direction of the text written on the back surface of the document faces the left in the reading area of the document table. The document of which front surface is B-su is arranged so that the upper direction of the text written on the front surface of the document faces upward in the reading area of the document table. FIG. 12A illustrates an example of the same document arrangement as in FIG. 3F.

Suppose that the user inputs operation indicating the start of reading and executes a reading process in a state in which two documents are arranged as illustrated in FIG. 3F. In this case, as illustrated in FIGS. 7A to 7F above, the read information 53 is acquired and the front/back determination information 54 is generated.

First, as illustrated in FIG. 12B, the image input unit 13 scans across the entire reading area of the document table and acquires image data of the entire reading area. Further, the individual image extractor 16 extracts an image on the back surface A-bk of the document on which "document-back" is written and stores the image data IMG013 of this document and extracts an image on the front surface B-su of the document on which "document-front" is written and stores the image data IMG014 of this document. Further, as illustrated in FIG. 7C, the read information 53 including the position coordinates of the apexes of the extracted individual images is acquired for each of the two documents.

In FIG. 7C, regarding the second reading, SC02 is provided as the reading number, the input image number N13 is provided for the image data IMG013, and the input image number N14 is provided to the image data IMG014. The horizontal length, the vertical length, and the midpoint position of each screen data are also calculated.

Next, as illustrated in FIG. 12C, after the document arrangement determiner 17 determines arrangement of two documents by using the acquired read information 53, the front/back determiner 18 determines front/back determination of the reading surface of the two documents by using the front/back arrangement setting information 51.

Further, the image position determiner 19 determines image positions by using position coordinates of two pieces of image data (IMG013, IMG014) acquired at second reading and position coordinates of two pieces of image data (IMG011, IMG012) acquired at first reading. The image positions are determined by comparing midpoint positions obtained from the apex position coordinates of the image data. If the midpoint positions are substantially the same or if a distance between two midpoint positions is shorter than a predetermined distance L0, it is determined that the documents of the individual images corresponding to the midpoint positions are the same documents.

As described above, when the position of the document arranged for reading the front surface A-su at first reading and the position of the document arranged for reading the back surface A-bk at second reading are substantially the same, it is determined that these two documents are the same. That is, it is determined that the image data IMG011 of which input image number is N11 is a front surface and the image data IMG013 of which input image number is N13 is a back surface of a single document. Therefore, to a document of which back surface A-bk is read and of which input image number is N13, the same document identification number G01 as the document identification number of the document N11 of the document of which front surface A-su is read is provided.

When the position of the document arranged for reading the back surface B-bk at first reading and the position of the document arranged for reading the front surface B-su at second reading are substantially the same, it is determined that these two documents are the same. That is, it is determined that the image data IMG012 of which input image number is N12 is a front surface and the image data IMG014 of which input image number is N14 is a back surface of a single document. Therefore, to a document of which front surface B-su is read and of which input image number is N14, the same document identification number G02 as the document identification number of the document N12 of the document of which back surface B-bk is read is provided. As a result, regarding the image data of the front surface A-bk and the back surface B-su of the two documents, the front/back determination information 54 of the documents is generated as illustrated in FIG. 7D.

Next, as illustrated in FIG. 12D, regarding the image data IMG014 of the front surface B-su, the output image generator 23 generates output image information 55 of the document by using the read information 53 and the front/back determination information 54. That is, when the output image information 55 illustrated in FIG. 7E is referred to, it is understood that the image data IMG014 of the input image number N14 is an image obtained by reading the front surface of the document of which document identification number is G02.

Regarding the image data IMG103 on the back surface A-bk, as illustrated in FIG. 12D, the text recognizer 20 recognizes the text.

As a result of text recognition, it is determined that the upward direction of the text of the vertically arranged document faces the left of the reading area of the document table, the rotation direction determiner 21 determines that it is necessary to rotate the image data IMG013 to the right by 90 degrees in order to align the text direction on the back surface A-bk with the text direction of the horizontally arranged document of which front surface is B-su.

Thereafter, the image rotator 22 rotates the image data IMG013 by 90 degrees to the right.

Further, regarding the image data IMG013 of the back surface A-bk, the output image generator 23 generates the output image information 55 of the document by using the read information 53 and the front/back determination information 54. That is, when the output image information 55 illustrated in FIG. 7E is referred to, it is understood that the image data IMG013 of the input image number N13 is an image obtained by reading the back surface of the document of which document identification number is G01.

With the processing described above, the second reading is ended and the image data IMG013 of the extracted individual image is stored as the back surface of the document G01, and the image data IMG014 of the extracted individual image is stored as the front surface of the document G02.

Suppose that regarding the image data of the front surface and the image data of the back surface of each of the two documents read by the two reading operations described above, images on the front and back surfaces of a single document are printed on a single print sheet, and the user performs input operation indicating start of printing in order to output two print sheets.

In this case, the text direction on the front surface and the text direction on the back surface of a single document are aligned, the front surface and the back surface of the same document are composed as illustrated in, for example, FIG. 4A and FIG. 13 and printed on a single print sheet, and two print sheets are output.

Therefore, also when the front surfaces and the back surfaces of a plurality of documents are to be read simultaneously, it is unnecessary to preset reading surfaces for first reading and second reading, and either of the front surfaces or the back surfaces may be read first. In either of the first reading and the second reading, documents may be arranged horizontally and vertically at the same time.

The user may understand that the horizontal arrangement of the document is for the reading of the front surface and the vertical arrangement of the document is for the reading of the back surface, and may arrange the same document at substantially the same position when turning the document over for second reading. This can reduce the burden on the reading operation of a plurality of documents.

Embodiment 3

In Embodiments 2-1 to 2-3, an example in which two documents are arranged so as not to overlap each other when reading these two documents simultaneously has been described. However, the number of documents to read simultaneously is not limited to one or two. Three or more documents may be read simultaneously if those documents can be arranged in the reading area of the document table. That is, the user may arrange three or more documents horizontally or vertically on the document table and perform the first reading, turn each document over at substantially the same position as each document at first reading, and (vertically or horizontally) arrange the documents in a manner different from that the documents were (horizontally or vertically) arranged at first reading, and perform second reading.

Embodiment 4

In the embodiments described above, the front surfaces and the back surface of the document to read are distinguished by arrangement of the documents. However, the invention is not limited to the same, and the reading resolution may be changed depending on document arrangement.

For example, when a photograph is included on the reading surface of the document, it may be desirable to make the document be read at a high resolution and, when no photograph is included but only text information is included on the reading surface of the document, the document may be read at a low resolution. Therefore, when a document is arranged horizontally, for example, the reading resolution may be preset to be high (for example, 1200 dpi) and, when the document is arranged vertically, the reading resolution may be preset to be low (for example, 300 dpi).

If a user wants a reading surface of a document including a photograph to be read, the user arranges the document horizontally. If horizontal arrangement is preset for reading at a high resolution, the document is read at a high resolution, and the image on the reading surface of the document including the photograph is input as a high quality image at a high resolution. When a reading surface including only text and no photograph is to be read, the document is arranged vertically. If vertical arrangement is preset for reading at a low resolution, the document is read at low resolution, and an image on a reading surface of a document including only text is input as a low resolution image.

When a plurality of documents including photographs is to be read simultaneously at a high resolution, all the plurality of documents is arranged horizontally. If horizontal arrangement is preset for reading at a high resolution, the document is read at a high resolution, and the images on the reading surfaces of the plurality of documents including the photographs are input as high quality images at a high resolution. When a plurality of documents including only text and no photograph is to be read simultaneously at a low resolution, all the plurality of documents is arranged vertically. If vertical arrangement is preset for reading at a low resolution, the document is read at a low resolution, and the images on the reading surfaces including only text are input as low resolution images.

The relationship between vertical and horizontal arrangement of the document and the resolution is not limited to the setting described above. The user may set the relationship such that the resolution is set to be low when the document is arranged horizontally, and the resolution is set to be high when the document is arranged vertically.

Figure 14:
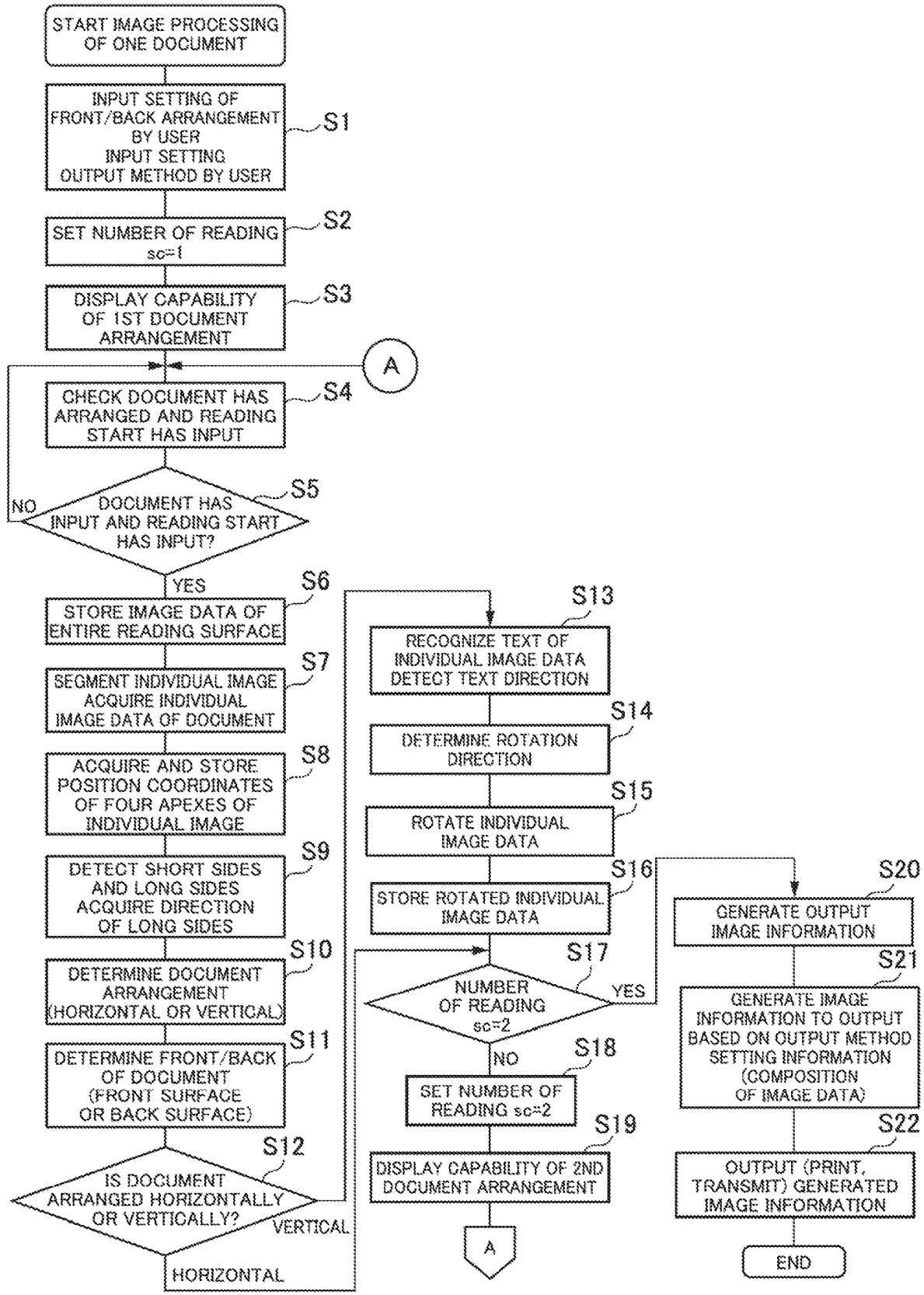
FIG. 14 is a flow diagram of an embodiment of image processing etc. in the image processing apparatus of the invention.
Figure 15:
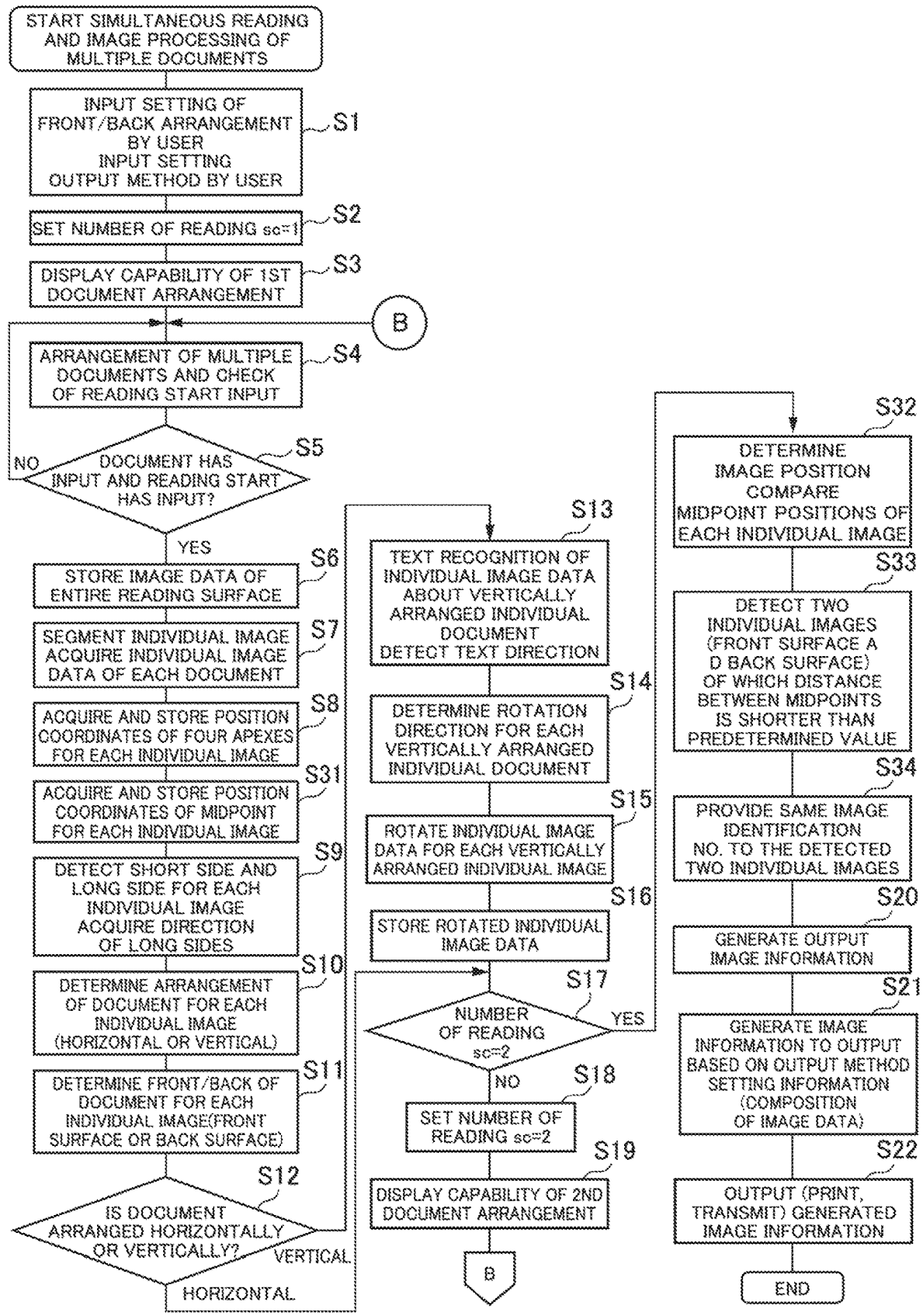
FIG. 15 is a flow diagram of an embodiment of image processing etc. in the image processing apparatus of the invention.

Flow Diagram of Image Processing Etc. of Image Processing Apparatus of Invention FIG. 14 and FIG. 15 are flow diagrams of an embodiment of image processing etc. in the image processing apparatus of the invention. The user determines document arrangement and an output method before reading the document(s) in the image processing apparatus according to the invention, and sets and inputs the document arrangement and the output method by using the operation unit 12.

Here, the document is rectangular. All the text written on the documents face the same direction. When the document is arranged horizontally, the document is arranged so that the long sides of the document substantially coincide with the direction of the long sides of the reading area of the document table, and that the upper direction of the text written on the document faces upward in the reading area of the document table.

In document arrangement, the user sets correspondence between the horizontal arrangement and the vertical document arrangement of the document and the front surface and the back surface of the document, and stores the front/back arrangement setting information 51 in advance. Regarding the output method, for example, any method is selected from among the four output methods illustrated in FIG. 5B described above and input, and the output method setting information 52 is stored in advance. However, if initially set information is used, the user does not necessarily have to set and input the front/back arrangement setting information 51 and the output method setting information 52.

Example of Image Processing when the Number of Documents to Read is One

Hereinafter, an outline of a process performed when the number of documents to read is one will be described. First, in order to read a predetermined first surface of the reading surfaces of a single document, the single document is arranged horizontally or vertically at an arbitrary position on the document table, and image data including the first surface of the document is read (a first reading process).

Next, the document is turned over, arranged horizontally or vertically in a manner different from that the document is arranged for the reading of the first surface at an arbitrary position on the document table, image data including the second surface of the document that is different from the first surface is read (a second reading process).

The individual image of the first surface of the document is extracted from the image data read in the first reading process. The individual image of the first surface of the document is extracted from the image data read in the first reading process. Regarding the individual image on the extracted first surface and the individual image of the second surface, arrangement of the document arranged on the document table with respect to the document table is determined.

Whether the reading surface of the document read in the first reading process and the reading surface of the document read in the second reading process are the front surface or the back surface, respectively, is determined from document arrangement with respect to the document table and document arrangement determined by using the front/back arrangement setting information 51 in which the front surface and the back surface which are the reading surfaces of the document are stored in association with each other in advance. Thereafter, for example, the extracted individual image of the first surface and the extracted individual image of the second surface are output in association with each other as image information of the front surface and the back surface of a single document.

FIG. 14 is a flow diagram of an embodiment of image processing etc. for reading a front surface and a back surface of a single document. In step S1 of FIG. 14, when the user inputs setting of front/back and arrangement, and setting of the output method by the user, the controller 11 stores the front/back arrangement setting information 51 and the output method setting information 52 in the storage 50.

In step S2, "1" indicating first reading is set as a variable sc indicating the number of reading. In step S3, it is displayed on the display unit 14 that the first document can be arranged on the document table, prompting the user to arrange the document. The user views this display and arranges a document to be read on the document table. At this time, the user arranges the document vertically or horizontally, considering the relationship between arrangement of the document set by himself/herself and the front/back of the document, so that a surface the user intends to be read is read. Thereafter, the user performs input operation indicating the start of reading.

In step S4, the controller 11 confirms whether the document has been arranged and reading start input has been made. If it is determined in step S5 that reading start input has been made, the process proceeds to step S6. Otherwise, the process returns to step S4 and stands for reading start input. In step S6, the image input unit 13 starts reading operation, acquires the entire image data of the reading area of the document table, and stores the acquired image data in the storage 50.

In step S7, the individual image extractor 16 extracts an individual image included in the acquired entire image data. In this flow diagram, since a single document is read, image data of the individual image of a single document is acquired. Here, the image data of the individual image is provided with a read number corresponding to the number of reading and an input image number specifying the input image, and is stored in the storage 50 as the read information 53. In step S8, position coordinates of four apexes of the individual image are acquired from the image data of the individual image and stored as a part of the read information 53.

In step S9, short sides and long sides of a rectangle for identifying the document are detected from the position coordinates of the four apexes, and the direction of the long side with respect to the reading area of the document table is acquired. That is, the length (horizontal length, vertical length) of the four sides constituting the rectangle is obtained, the horizontal length and the vertical length are compared, and the direction of the longer side of the rectangle of the document is obtained. In step S10, the document arrangement determiner 17 determines document arrangement from the direction of the acquired direction of the long sides. The determination result of document arrangement is stored as a part of the front/back determination information 54. If the direction of the long side of the rectangle of the document substantially coincides with the direction of the long side of the reading area of the document table, it is determined that the document is arranged horizontally. If the direction of the long side of the rectangle of the document substantially coincides with the direction of the short side of the reading area of the document table, it is determined that the document is arranged vertically.

In step S11, the front/back determiner 18 determines whether the currently read document is on the front surface or the back surface by using the determined document arrangement and the front/back arrangement setting information 51. The front/back determination result of the document is stored as a part of the front/back determination information 54. For example, if the determined document arrangement is horizontal, when the "front surface" of the reading surface is stored in the front/back arrangement setting information 51 in association with "horizontal arrangement" of the document arrangement, whether the read document is on the front surface or the back surface is determined to be "front surface." When the "back surface" of the reading surface is stored in association with "horizontal arrangement," whether the read document is on the front surface or the back surface is determined to be "back surface." If there is only a single document, the same number is provided as a document identification number regardless of the determination result of the front/back determination, and is stored as a part of the front/back determination information 54.

If it is determined in step S12 that document arrangement determined in step S10 is "horizontal arrangement," the process proceeds to step S17, whereas if it is "vertical arrangement," the process proceeds to step S13. In step S13, the text recognizer 20 recognizes text on the image data of the individual image read in the vertical arrangement. The text recognizer 20 also detects the direction of the recognized text. For example, if the upper direction of the recognized text coincides with the upper direction of the reading area of the document table, the recognized text direction is determined to be upward. If the upper direction of the recognized text coincides with the right direction of the reading area of the document table, the recognized text direction is determined to be right.

In step S14, the rotation direction determiner 21 determines the direction in which the image data of the individual image is to be rotated from the direction of the recognized text. Here, the rotation direction and the rotation angle of the image data are determined such that the upper direction of the recognized text is upward of the reading area of the document table. For example, when the upper direction of the recognized text coincides with the right direction of the reading area of the document table, the rotation direction of the image data is set to the left direction and the rotation angle is set to 90 degrees ("left 90 degrees"). When the upper direction of the recognized text coincides with the left direction of the reading area of the document table, the rotation direction of the image data is set to the right direction and the rotation angle is set to 90 degrees ("right 90 degrees").

When the upper direction of the recognized text coincides with the lower direction of the reading area of the document table, the rotation direction of the image data is set to the right direction and the rotation angle is set to 180 degrees ("right 180 degrees"). However, if the rotation angle is 180 degrees, the rotation direction may be either left or right. In addition, when the upper direction of the recognized text coincides with the upper direction of the reading area of the document table, it is not necessary to rotate the image data.

In step S15, the image rotator 22 rotates the image data of the individual image based on the determined rotation direction. Then, the image data is rotated so that the upper direction of the recognized text of the vertically arranged document coincides with the upper direction of the reading area of the document table. In step S16, the image data of the individual image after rotation is stored again as read information 53.

In step S17, whether the variable sc indicating the times of reading is 2 is checked. If the times of reading sc is 2, the process proceeds to step S20. Otherwise, that is, if the times of reading sc is 1, the process proceeds to step S18, and 2 is set as the times of reading sc to perform the second reading.

In step S19, it is displayed on the display unit 14 that the second document can be arranged on the document table, prompting the user to arrange the document, and the process returns to step S4. The user views this display, turns over a document to be read, and arranges on the document table. At this time, in order to make a surface different from the first reading be read, the user arranges the document vertically or horizontally which is the way opposite to that from the first reading, considering the relationship between arrangement and front/back of the document, so that a surface the user intends to be read is read. Thereafter, the user performs input operation indicating the start of reading.

In step S20, the output image generator 23 generates the output image information 55. The output image information 55 is generated from the read information 53 and the front/back determination information 54 stored in the storage 50. For example, as described above, information as illustrated in FIG. 5E is generated.

In step S21, based on the previously set output method setting information 52, image information to output is generated. For example, when "outputting front/back image in composition" is set, the stored image data of the front surface and the image data of the back surface are composed so as to be output on a single print sheet. In step S22, the output unit 15 outputs the generated image information. For example, the generated image information is printed on a single print sheet or transmitted to an external information processing apparatus via a network. The flow diagram described above is an embodiment of image processing when there is a plurality of documents to read simultaneously.

Example of Image Processing when there is Plurality of Documents to Read

Hereinafter, an outline of a process performed when there is a plurality of documents to be read simultaneously will be described. First, in order to read a predetermined first surface of each document among the reading surfaces of a plurality of documents, a plurality of documents is arranged horizontally or vertically so as not overlap one another on the document table, and image data including the first surface of each document is read (a first reading process).

A plurality of documents is turned over and each document is arranged horizontally or vertically, in a manner different from that in which the documents are arranged for reading the first surface, on the document table at substantially the same position at which the first surface of each document is read image data including the second surface of the document that is different from the first surface is read (a second reading process).

Individual images of the first surfaces of the plurality of documents are extracted from the image data read in the first reading process. Individual images on the second surfaces of the plurality of documents are extracted from the image data read in the second reading process. Regarding each extracted individual image on the first surface and each extracted individual image of the second surface, arrangement of the document arranged on the document table with respect to the document table is determined.

Whether the reading surface of the document read in the first reading process and the reading surface of the plurality of documents read in the second reading process are the front surface or the back surface, respectively, is determined from document arrangement with respect to the document table and document arrangement determined by using the front/back arrangement setting information 51 in which the front surface and the back surface which are the reading surfaces of the document are stored in association with each other in advance.

The individual image of the first surface and the individual image of the second surface of the document arranged at substantially the same position on the document table are associated with each other as image information of the front surface and the back surface of a single document and, for example, image information of the front surface and the back surfaces associated with the document is output for each of a plurality of read documents.

FIG. 15 is a flow diagram of an embodiment of image processing etc. for reading front surfaces and back surfaces of a plurality of documents. The same step numbers are provided to the steps in which the same processing as those of the flow diagram illustrated in FIG. 14 are executed. In this case, the user arranges a plurality of documents to be read on the document table side by side so as not to overlap one another, and simultaneously reads one of the surfaces of each document.

Next, from step S1 to step S8 in FIG. 15, the same processes as illustrated in FIG. 14 are performed. First, the same processing as that illustrated in FIG. 14 is performed. That is, in step S1, the front/back arrangement and the output method input by the user are stored in the storage 50 as the front/back arrangement setting information 51 and the output method setting information 52. In step S2, 1 is set to the variable sc indicating the number of reading. In step S3, it is displayed on the display unit 14 that the first document can be arranged on the document table, prompting the user to arrange the document.

The user views this display and arranges a plurality of documents to read on the document table so as not to overlap one another. At this time, the user arranges a plurality of documents vertically or horizontally, considering the relationship between arrangement of the document set by himself/herself and the front/back of the document, so that a surface the user intends to be read is read. Thereafter, the user performs input operation indicating the start of reading.

If it is confirmed in step S5 that reading start input has been made, the process proceeds to step S6. In step S6, starts reading operation, acquires the entire image data of the reading area of the document table, and stores the acquired image data in the storage 50.

In step S7, the individual image extractor 16 extracts an individual image included in the acquired entire image data. In this flow diagram, since a plurality of documents is read, image data of a plurality of individual images is acquired.

Here, the image data of each individual image is provided with a read number corresponding to the number of reading and an input image number specifying the input image, and is stored in the storage 50 as the read information 53. In step S8, position coordinates of four apexes of the individual image are acquired for each piece of the image data of the individual image and stored as a part of the read information 53.

Thereafter, in step S31, the position coordinates of the midpoint are acquired for each individual image and stored as part of the read information 53. As a result, for each of the plurality of individual images read for the first time or the second time, a midpoint position representing each arrangement position is stored. This midpoint position is used to associate documents arranged at substantially the same positions at first reading and the second reading as the front surface and the back surface of the same document.

Next, from step S9 to step S17 in FIG. 15, the same processes as illustrated in FIG. 14 are performed. That is, in step S9, short sides and long sides of a rectangle for identifying the document are detected from the position coordinates of the four apexes, and the direction of the long side with respect to the reading area of the document table is acquired. In step S10, for each of a plurality of documents, document arrangement is determined from the direction of the acquired long side. In step S11, whether each of the plurality of documents is on the front surface or the back surface is determined by using the determined document arrangement and the front/back arrangement setting information 51. Also, since there is a plurality of documents, at the time of the first reading, different numbers are provided as document identification numbers for each individual document read at first reading, and stored as a part of the front/back determination information 54.

If it is determined in step S12 that document arrangement determined in step S10 is "horizontal arrangement," the process proceeds to step S17, whereas if it is "vertical arrangement," the process proceeds to step S13. In step S13, text is recognized regarding the vertically arranged and read image data, and the direction of the recognized text is detected. In step S14, the direction in which the image data of the individual image is to be rotated and the rotation angle are determined from the direction of the recognized text. In step S15, the image data of the individual image is rotated based on the determined rotation direction. In step S16, the image data of the individual image after the rotation is stored again as the read information 53.

In step S17, whether the variable sc indicating the times of reading is 2 is checked. If the times of reading sc is 2, the process proceeds to step S32. Otherwise, that is, if the times of reading sc is 1, the process proceeds to step S18, and 2 is set as the times of reading sc to perform the second reading.

In step S19, it is displayed on the display unit 14 that the second document can be arranged on the document table, prompting the user to rearrange the document, and the process returns to step S4. The user views this display, turns over all the plurality of documents at substantially the same positions as the first arrangement positions, and place them on the document table. At this time, in order to make a surface different from the first reading be read, the user arranges each document vertically or horizontally which is the way opposite to that from the first reading, considering the relationship between arrangement and front/back of the document, so that a surface the user intends to be read is read. Thereafter, the user performs input operation indicating the start of reading.

In FIG. 15, unlike FIG. 14, for each of a plurality of documents, the processes from step S32 to step S34 are performed in order to associate the originals placed at substantially the same positions at first reading and the second reading as the front and back surfaces of the same original.

In step S32, the image position determiner 19 determines the image position for each of the plurality of documents. Here, the proximity of the image position is determined by comparing the midpoint positions of the individual images acquired in step S31. For example, the midpoint position of each individual image acquired at first reading and the midpoint position of each individual image acquired at second reading are read out from the storage 50, and the distance between the two midpoint positions is calculated.

If it is determined in step S33 that the distance between the two midpoint positions is shorter than a predetermined distance L0, two individual images of which surfaces of the individual images of corresponding to the two midpoint positions are the front surface and the back surface are detected. That is, when the distance between the center position of the individual image acquired at first reading and the center position of the individual image acquired at second reading is shorter than the predetermined distance L0, it can be determined that the two individual images are substantially at the same position, and if one of the two individual images is the front surface and the other is the back surface, it can be determined that the two individual images are the front surface and the back surface of the same document.

In step S34, the same image identification number is provided to the two individual images which are determined to be the front surface and the back surface of the same document. That is, the same image identification number as the image identification number provided to the individual image acquired at first reading is provided to the individual image acquired at second reading that is determined to be the same document. This indicates that the two individual images to which the same image identification number is provided are the front surface and the back surface of the same document.

Next, from step S20 to step S22 in FIG. 15, the same processes as illustrated in FIG. 14 are performed. In step S20, the output image generator 23 generates, for example, the output image information 55 as illustrated in FIG. 7E, by using the reading information 53 and the front/back determination information 54 stored in the storage 50. In step S21, based on the previously set output method setting information 52, image information to output is generated. For example, if "outputting front/back image in composition" is set, for each document, the image data on the front surface and the image data on the back surface to which the same document identification number is provided is composed to be output to a single print sheet. In step S22, the output unit 15 outputs the generated image information for a plurality of documents. For example, image information generated for a plurality of documents is printed on a different print sheet for each document, or is transmitted to an external information processing apparatus via the network. The flow diagram described above is an embodiment of image processing when there is a plurality of documents to read simultaneously.

What is claimed is:

1. An image processing apparatus comprising:
   a document table on which at least one document is arrangeable;
   an image input unit that reads the document arranged on the document table;
   an individual image extractor that extracts image data read by the image input unit on a document basis to obtain image data of an individual image;
   a storage which stores association information between an arrangement status of the document with respect to the document table and a front surface or a back surface that is a reading surface of the document to be read by the image input unit;
   an arrangement status determiner that determines the arrangement status of the document with respect to the document table on the basis of the image data of the individual image; and
   a reading surface determiner that determines the reading surface of the document read by the image input unit on the basis of the association information and the arrangement status determined by the arrangement status determiner, wherein
   the image processing apparatus
   further comprising an image position determiner that determines a central position of the document corresponding to the individual image on the basis of the read image data, compare the central position of the document read in first reading by the image input unit, and the central position of the document read in second reading by the image input unit, and determine whether these two documents are the same in accordance with a comparison result.

2. The image processing apparatus according to claim 1, wherein the image position determiner determines that the two documents are the same when a distance between the central position of the document read in the first reading and the central position of the document read in the second reading is shorter than a predetermined distance.

3. The image processing apparatus according to claim 1, wherein:
   the storage stores output method setting information used to set an output method of image data of the individual image; and
   the image processing apparatus further comprises an output unit that outputs image information from the image data of the individual image in accordance with the output method setting information, wherein
   the output unit outputs the image data of the individual images, which are determined to be the same document by the image position determiner, in association with each other.

4. The image processing apparatus according to claim 3, further comprising:
   a text recognizer that recognizes text of the individual image and determine a direction of the text included in the individual image; and
   an image rotator that rotates the individual image in accordance with a determination result of the text recognizer and turn the text recognized by the text recognizer to a predetermined direction, wherein
   the output unit generates the image information from the individual image rotated by the image rotator and outputs the generated image information.

5. An image processing method, comprising:
   reading at least one document arranged on a document table by an image input unit;
   extracting image data read by the image input unit on a document basis to obtain image data of an individual image;

storing, in storage, association information between an arrangement status of the document with respect to the document table and a front surface or a back surface that is a reading surface of the document to be read by the image input unit;

determining the arrangement status of the document with respect to the document table on the basis of the image data of the individual image; and determining a reading surface of the document read by the image input unit on the basis of the association information stored in the storage and the determined arrangement status, wherein the reading by the image input unit includes first reading for reading a first surface of the document and second reading for reading a second surface of the document;

the extracting of the individual image includes extracting at least one piece of image data read in the first reading on a document basis as a first individual image and extracting at least one piece of image data read in the second reading on a document basis as a second individual image;

the determining of the arrangement status includes determining the arrangement status on the basis of at least one piece of image data as the first individual image and determining the arrangement status on the basis of at least one piece of image data as the second individual image;

the determining of the reading surface determines whether the at least one reading surface of the document read in the first reading and the second reading is the first surface or the second surface on the basis of the arrangement status and the association information; and the image processing method further comprises:

determining a central position of the document corresponding to the first individual image and a central position of the document corresponding to the second individual image on the basis of at least one piece of the first image data and at least one piece of the second image data, and comparing the determined central positions;

determining whether the document corresponding to the first individual image and the document corresponding to the second individual image are the same in accordance with a comparison result, and outputting the image data of the first individual image and the image data of the second individual image, which are determined to be the same document, in association with each other.

\* \* \* \* \*